Sept. 29, 1936.  A. A. DICKE  2,055,522
CASH REGISTER
Original Filed Feb. 24, 1927    10 Sheets-Sheet 1

Inventor
Allen A. Dicke
By
Earl Bunst,
His Attorney

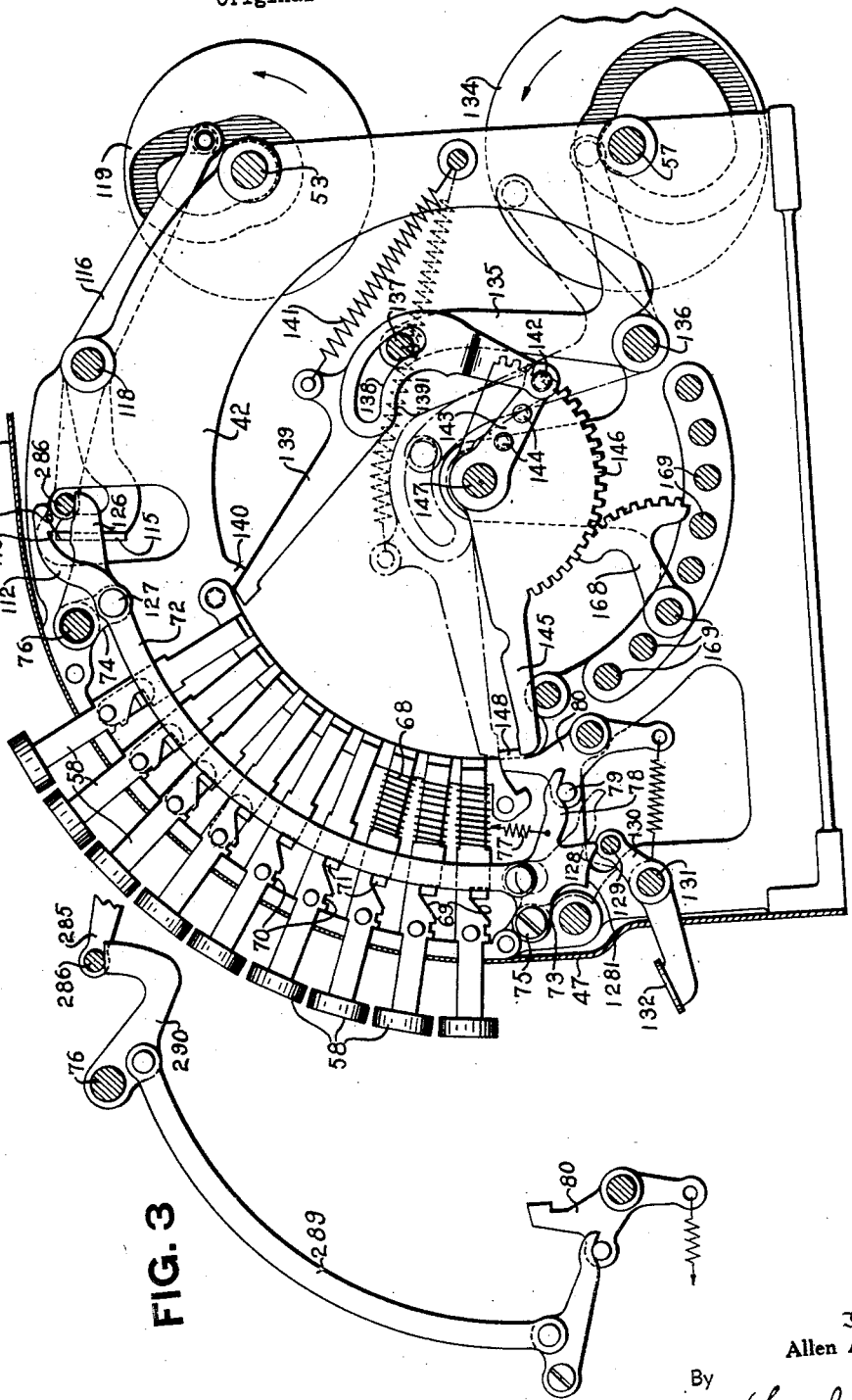

Sept. 29, 1936.  A. A. DICKE  2,055,522
CASH REGISTER
Original Filed Feb. 24, 1927   10 Sheets-Sheet 3
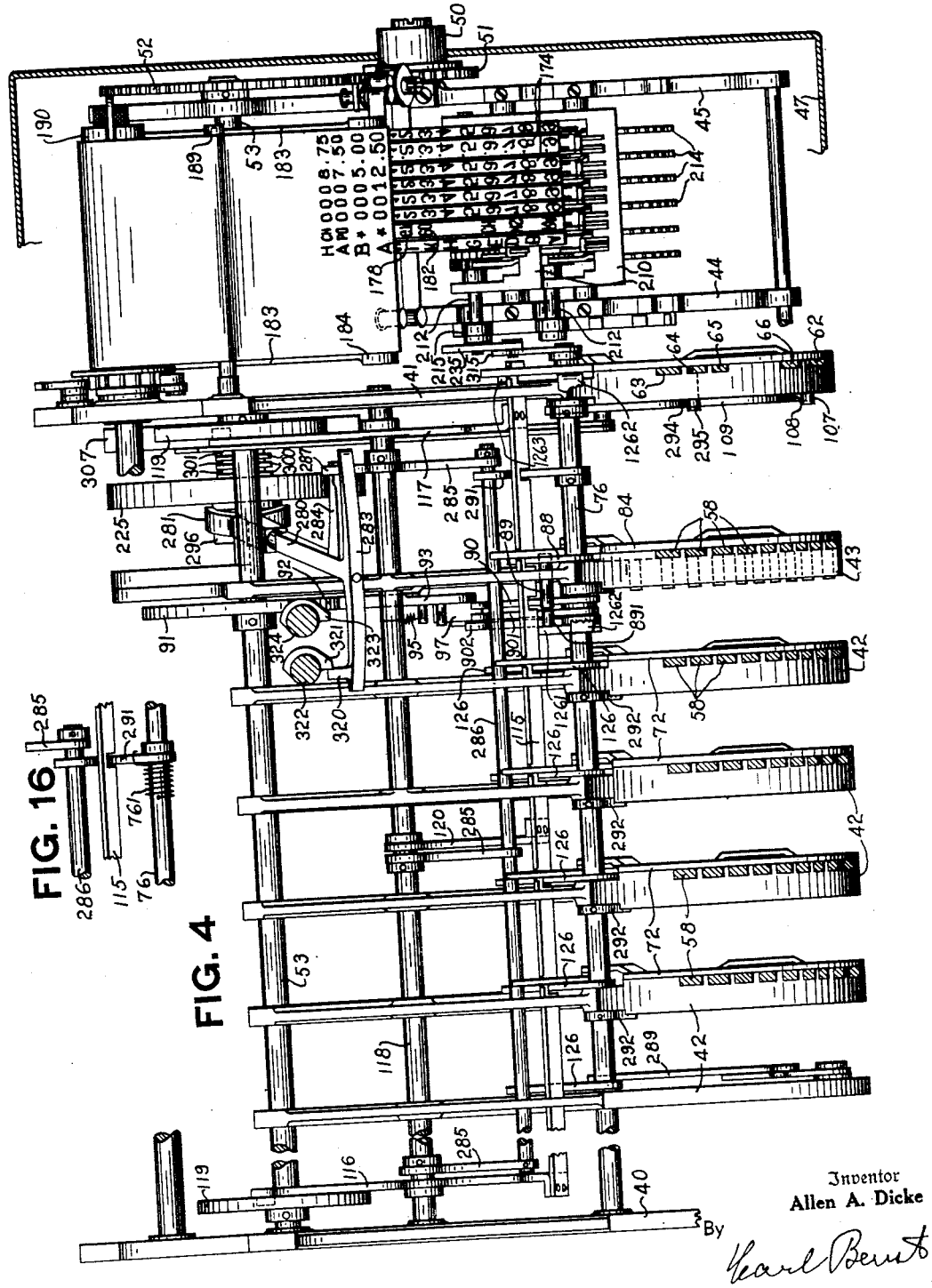
Inventor
Allen A. Dicke
By
His Attorney Sept. 29, 1936.   A. A. DICKE   2,055,522
CASH REGISTER
Original Filed Feb. 24, 1927   10 Sheets-Sheet 4

Inventor
Allen A. Dicke
By
Earl Bunst
His Attorney

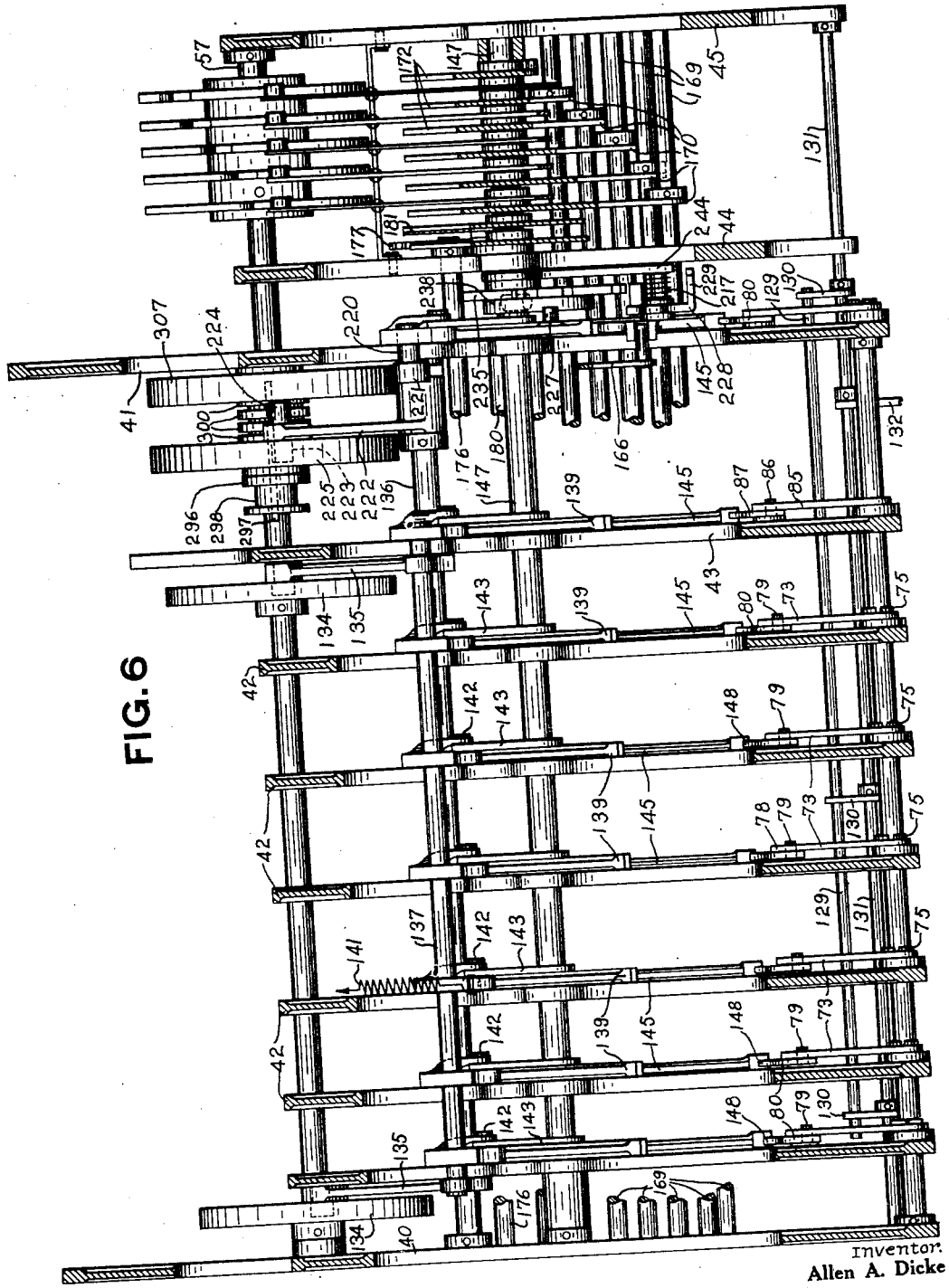

Sept. 29, 1936.  A. A. DICKE  2,055,522
CASH REGISTER
Original Filed Feb. 24, 1927    10 Sheets-Sheet 7
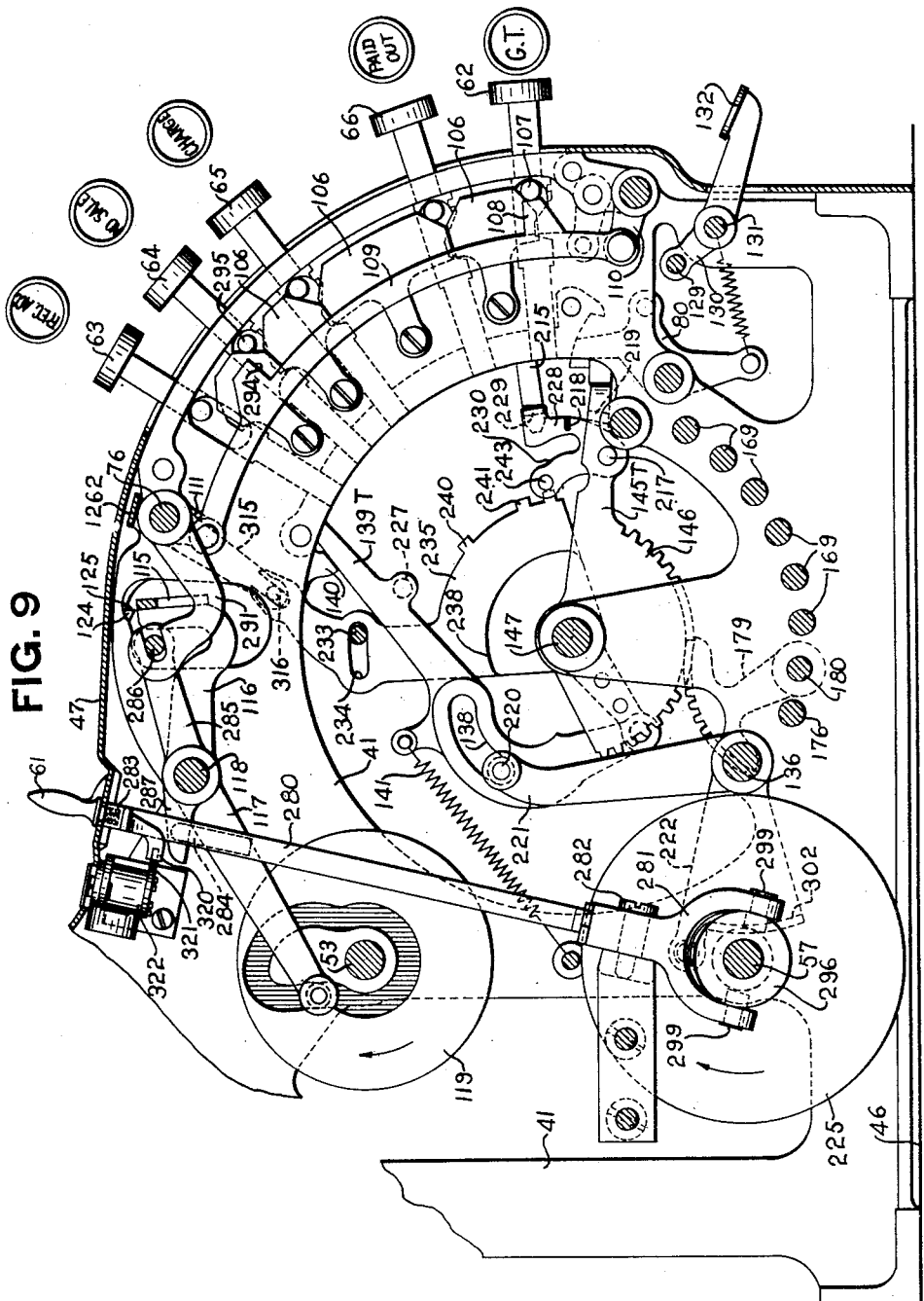
Inventor
Allen A. Dicke
By
Carl Burst
His Attorney Sept. 29, 1936. A. A. DICKE 2,055,522
CASH REGISTER
Original Filed Feb. 24, 1927 10 Sheets-Sheet 8
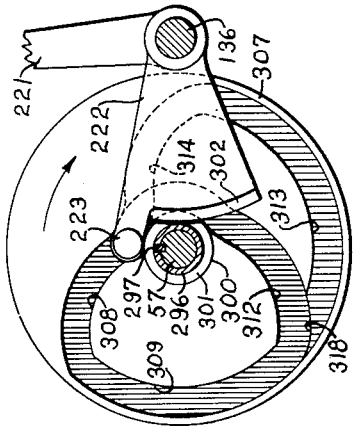
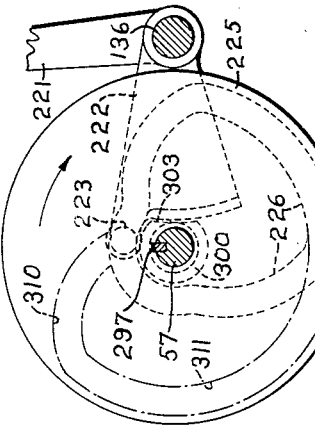
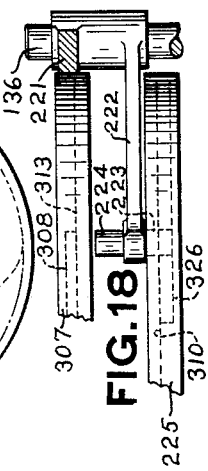
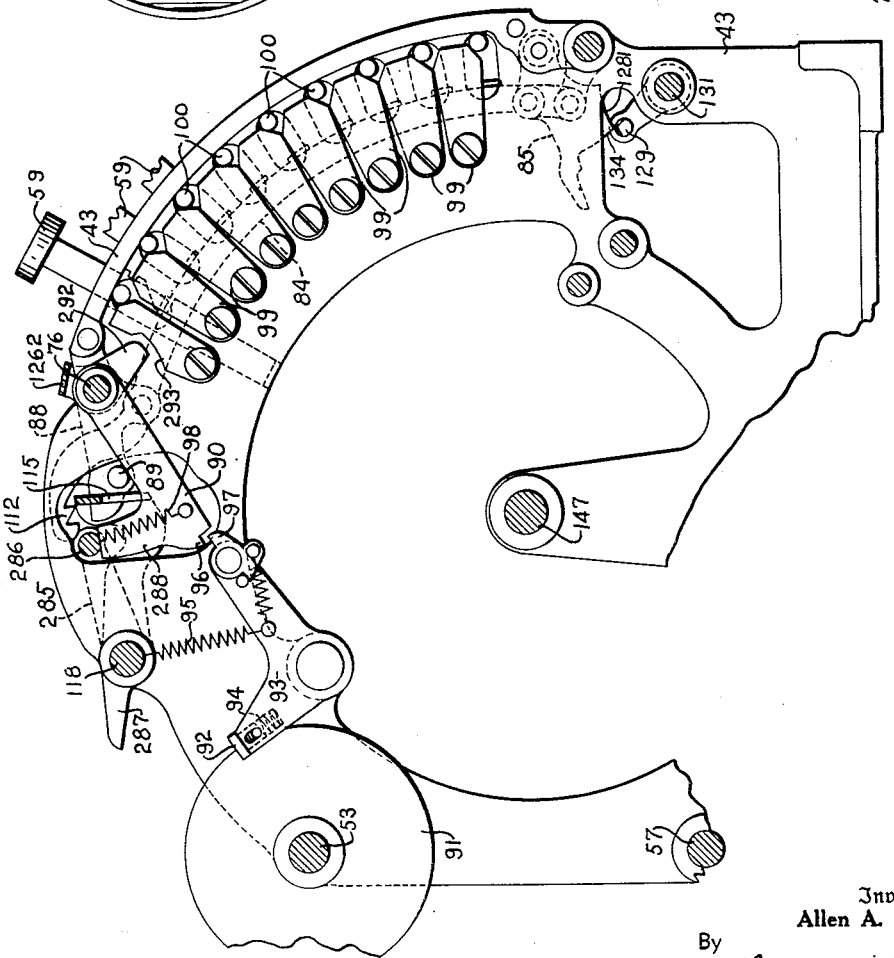
Inventor
Allen A. Dicke
By
Earl Bennett
His Attorney Sept. 29, 1936.  A. A. DICKE  2,055,522
CASH REGISTER
Original Filed Feb. 24, 1927   10 Sheets-Sheet 9
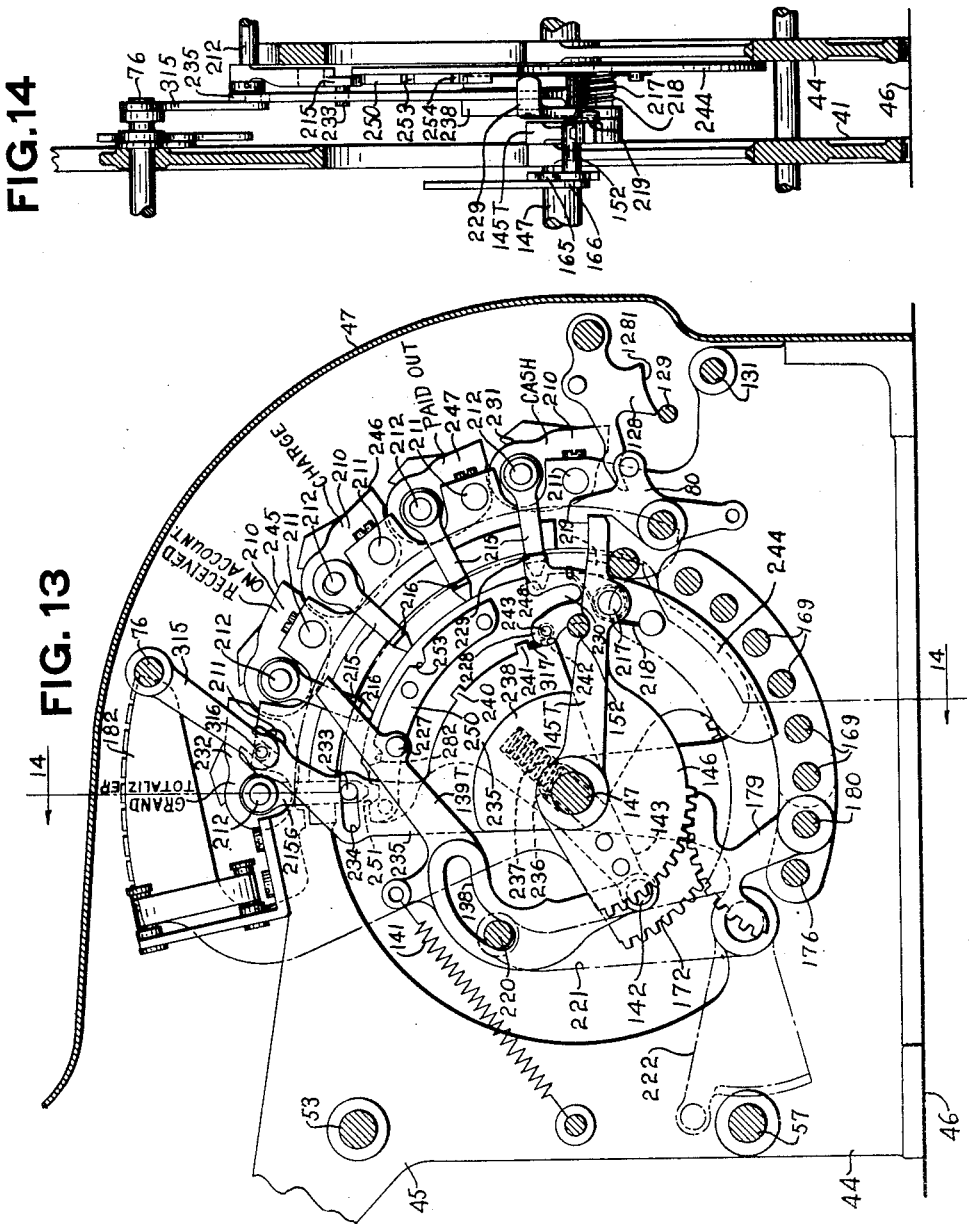
Inventor
Allen A. Dicke
By
Carl Beust
His Attorney

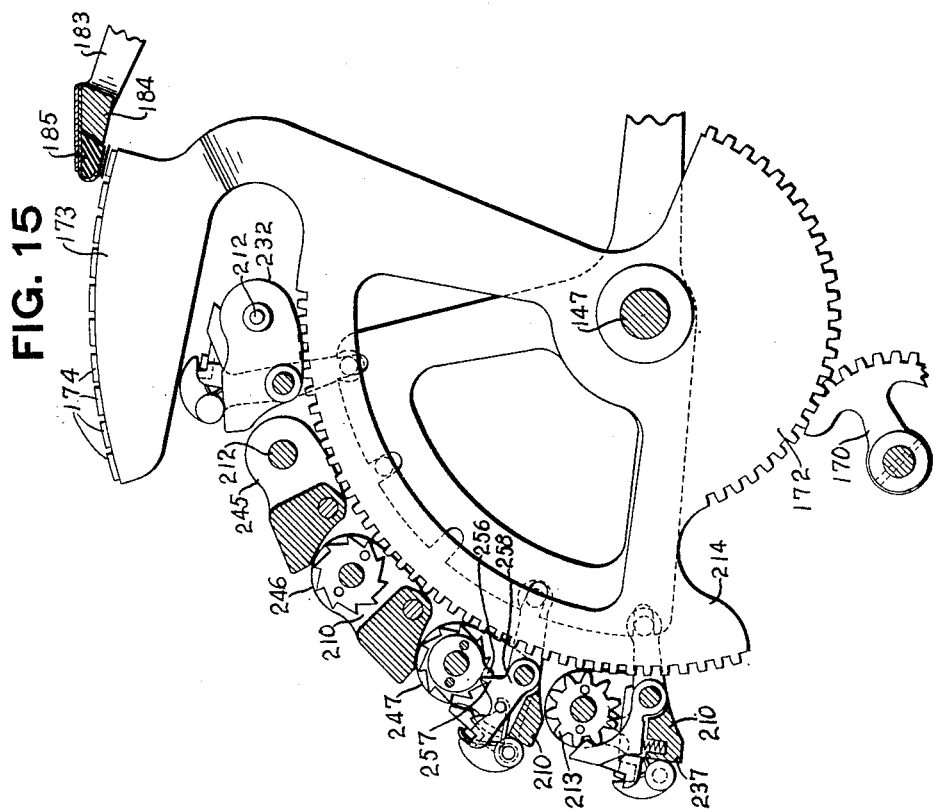

Patented Sept. 29, 1936

2,055,522

UNITED STATES PATENT OFFICE 2,055,522

CASH REGISTER

Allen A. Dicke, Montclair, N. J., assignor to The National Cash Register Company, a corporation of Maryland Original application February 24, 1927, Serial No. 170,494. Divided and this application November 24, 1933, Serial No. 699,511

15 Claims. (Cl. 235—130)

This invention relates to cash registers and the like, and is a division of application for United States Letters Patent of A. A. Dicke, Serial No. 170,494, filed February 24, 1927, now Patent No. 2,048,060, issued July 21, 1936.

The invention is particularly related to the type of cash registers suitable for registering commercial transactions by entering the amounts of such transactions in suitable totalizer devices and for providing printed records of the items and totals of such transactions, it being broadly an object of the present invention to provide an improved mechanism for accomplishing the above function, the inherent characteristics of which are: simplicity in construction, reduction of number of parts, ease in manufacture of the component parts together with their assembly in the machine.

One object of the present invention is to provide an improved type of differential mechanism which is simple in form but positive in its operation, resulting in the correct addition of amounts entered into several totalizers in the machine.

Briefly, the object just stated, which results from the improved design are accomplished in the preferred form of embodiment herein shown but providing two complementally movable levers, there being a pair of levers for each bank of keys, their extents of movement being determined by the keys depressed in each bank. A universal operating member is also provided for operating the levers of certain banks, the arrangement being such that the levers of one bank may be stopped in a different position than the levers in another bank so that the proper differential movement may be imparted to the related actuating rack. One of each pair of levers is normally locked, but when a key in the associated bank is depressed a detent is actuated to move a zero stop pawl of that bank out of engagement with the lever to permit movement of the latter by the common operating member.

It is also an object of the present invention to provide an improved type of key detent mechanism which is simple in construction but effective in operation, one of the detents—that of the clerk's bank of keys in the embodiment shown— being capable of releasing the machine for adding operations.

Another object of the present invention is to provide a plurality of individual totalizers for keeping separately the amounts of the receipts pertaining to the different transactions occurring in mercantile establishments in which the machine is intended to be used, and also to provide an improved type of mechanism for accumulating the grand total of the amounts entered in selected ones of the individual totalizers.

In connection with the totalizing devices it is broadly an object of the invention to provide an improved type of totalizer selecting mechanism, the differential mechanism employed to effect selection being similar in form and construction to that utilized in connection with the other banks of keys thus dispensing with the need of a number of special parts. The totalizer selecting devices are so arranged that the totalizers are positively engaged and disengaged from the actuators, thus dispensing with the necessity of having springs to return certain parts and insuring accuracy in the different operations of the machine. An improved locking mechanism is also provided whereby the totalizers may not be surreptitiously or accidentally operated.

The totalizer selecting devices are so arranged that an item will normally be entered in the cash totalizer, the same amount being simultaneously entered in the grand totalizer. The amounts pertaining to other transactions are entered in the appropriate totalizer by depressing the related key and then operating the machine, the grand totalizer selecting devices being so arranged that when items are entered in certain totalizers the grand totalizer will not be operated.

It is also an object of the present invention to provide an improved type of controlling mechanism whereby the machine may be normally conditioned for entering and printing items, but by the simple adjustment of a control lever the machine may be conditioned so that the totals standing upon any of the totalizers may be recorded.

In conjunction with the total-taking devices, it is a further object of the invention to provide an improved mechanism whereby the machine may be released for one operation by simply adjusting the total lever out of the normal adding position. This simplifies to a great extent the operations of the machine, permitting the totals to be obtained rapidly with a minimum of effort, which is a desideratum in machines of this type. Subsequent total-taking operations after the first are, in accordance with this invention, placed under the control of the transaction bank of keys. The construction is such, however, that this bank of keys has no control over the release of the machine when adding.

The machine is also provided with mechanism whereby the totals standing upon the individual totalizers may not only be recorded but whereby these totalizers may coincidentally be reset so that items pertaining to a subsequent period of business may be entered therein.

In connection with the total-taking and resetting devices it is broadly an object of this invention to provide an improved type of mechanism which requires few parts but is effective in its operation. This in the embodiment shown comprises a plurality of cams which may be adjusted under control of the total lever so that the machine may be readily conditioned for entering the items, reading totals or resetting the totalizers, the cams being so arranged that the timing of the engagement and disengagement of the selected totalizers with the actuating rack may be changed as required.

The present invention also comprises novel interlocking devices between the different manipulative members to prevent misoperation either intentionally or accidental. The interlocks are very simple, thus precluding any possibility of their becoming out of order. A novel interlocking mechanism is provided between the error and operating keys, which while the error key is being operated prevents the depression of any of the operating keys, and conversely after the machine has been released for operation locks the error key against manipulation.

The machine is also equipped with a "single" key mechanism for preventing the depression of more than one key in a bank, this mechanism being so coordinated with the total control lever that when the latter is moved out of the "add" position the key stop will be locked against operation thus preventing any of the amount keys from being depressed. Furthermore, movement of the total lever out of the adding position will release any of the previously depressed amount keys.

The "grand" total key in the illustrated embodiment is located in the bank of transaction keys and in normal item entering operations is locked, but when the machine is conditioned for total operations movement of the total lever out of the adding position is adapted to unlock the grand total key since the latter may be employed in total-taking operations.

A simple interlock is also provided for preventing movement of the total lever out of the adding position when a clerk's key has been operated to release the machine for operation.

Improved devices are also provided for locking the machine against operation in the event the total lever should be improperly adjusted and also whereby the total lever may not be moved out of its adjusted position when the machine has been partially operated.

With these and incidental objects in view the invention consists in certain novel features of construction and combinations of parts the essential elements of which are set forth in appended claims, and a preferred form of embodiment of which is hereinafter described with reference to the drawings which accompany and form part of the specification.

Of said drawings:

Fig. 2 is a transverse sectional view taken through the machine showing a bank of amount keys, the differential mechanism associated therewith, and the common member utilized to lock and subsequently release the amount keys.

Fig. 3 is a view in side elevation of the zero stop disabling member for the differential devices of the fifth and sixth overflow banks.

Fig. 4 is a top plan view of the machine, the cabinet having been removed, showing the supporting frame, the total control lever and its connection to the releasing mechanism for the machine. This view also shows the arrangement of the printing segments and a number of the elements comprising the printing mechanism.

Fig. 6 is a top plan view taken substantially above the central portion of the machine showing the arrangement of the key banks and the connecting shafts between the differential devices and the totalizer actuators and the printing segments.

Fig. 9 is a transverse sectional view of the machine taken to the left of the bank of transaction keys and shows in detail the different key locking devices and their connections to the total control lever.

Fig. 10 is a transverse sectional view taken at the left side of the clerk's bank of keys and shows in detail the releasing mechanism for the machine which is controlled either by a clerk's key or the total control lever.

Fig. 11 is a detail of the cam for operating the totalizer selecting mechanism during total taking operations.

Fig. 12 is a detail view of the cam which is a companion cam to that shown in Fig. 11 and shows particularly the arrangement of the cam slot effective during adding and reading total operations.

Fig. 13 is a transverse sectional view of the machine showing the totalizer selecting devices and their cooperation with the multiple totalizers.

Fig. 14 is a front elevation of some of the devices illustrated in Fig. 13.

Fig. 15 is a partial transverse sectional view showing the arrangement of the multiple totalizers and the operating segment, together with the printing segments and the printing platen.

Fig. 16 is a partial top plan view illustrating the devices whereby the control lever may release incorrectly depressed keys.

Fig. 18 is a top plan view of the cams for effecting different accounting operations.

*General description*

Figure 1:
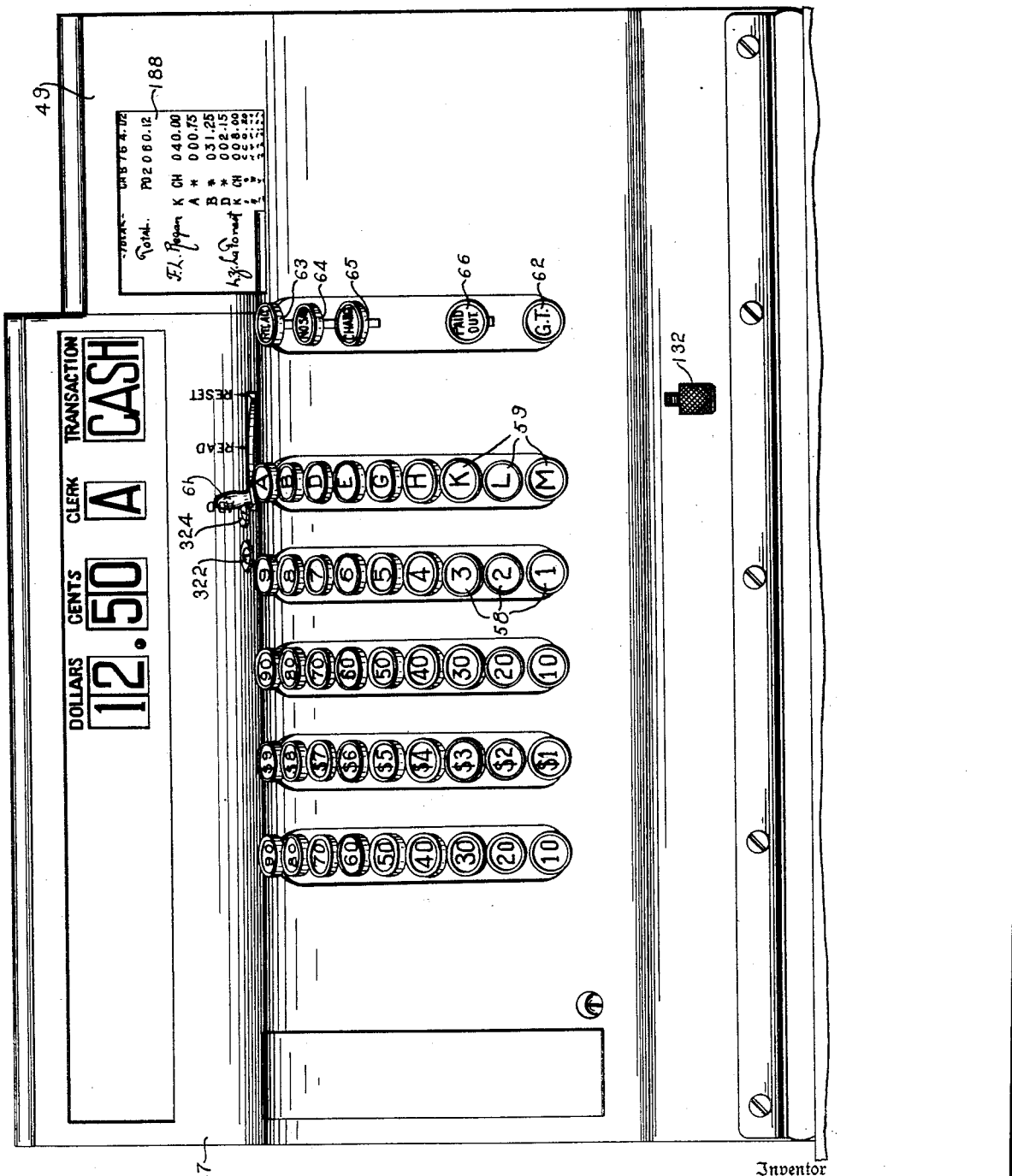
Fig. 1 is a front elevation of a machine embodying the invention showing the controlling keys and the total controlling lever.

The machine herein disclosed includes various mechanisms common in machines of this class, namely; a driving mechanism, a keyboard, differential mechanism, a grand totalizer, a plurality of transaction totalizers, a printing mechanism here shown for printing items on a detail strip but which may be employed equally as well for printing upon inserted slips or issued checks and devices employed for the printing of totals, and novel locking and interlocking devices to prevent misoperation of the machine.

The driving mechanism comprises two drive shafts with gear connections whereby these shafts may be caused to make one rotation by two rotations of a crank handle in either item-entering operations or total-taking operations. The driving shaft and crank handle are normally locked but in item entering operations are released by the depression of one of a series of clerks' keys, while in total taking operations, since the clerks' keys are ordinarily not employed, connections are effected between the total lever and the releasing device of the machine so that movement of the total lever to certain positions will release the machine in exactly the same manner as the clerks' keys do in item entering operations.

The keyboard comprises a total control lever, a plurality of banks of amount keys, one bank of clerks' keys, and a bank of transaction keys included in which is a "grand total" key, which is locked against operation when the machine is conditioned for item entering operations.

The differential mechanism for each bank comprises in general a pair of levers which are positively moved complementary extents, the movement of the levers being governed by the key depressed. A pair of such levers is provided for each bank of amount keys, clerks' keys and transaction keys, the amount and clerk differential mechanisms being operated by a common member. By means of this differential mechanism a variable movement is imparted to each totalizer actuating rack so that by its cooperation with the corresponding pinion of the selected totalizer it will actuate the totalizer element differentially during the return stroke of the actuator. Only the amount differential devices are utilized to actuate the totalizer pinions while these differential devices as well as those associated with the transaction and clerk's key banks are utilized for the purpose of differentially adjusting the related type carriers. By suitable connections the type carriers are set differentially under control of the keys when items are entered or under control of the totalizers when totals are printed, such controls being active as determined by the movement of the control lever to a selected position.

To accumulate the amounts entered in the machine, there is provided a plurality of individual transaction totalizers, the frames of which are so mounted that their pinions may be brought directly into cooperative relationship with the actuators, which in turn are controlled by the banks of amount manipulative devices, such as keys. For the purpose of selectively operating any of the transaction totalizers, which in the machine shown, are appropriated to each of the transaction keys and one for normally receiving cash entries, the differential devices associated with the transaction banks are provided.

While in the machine shown the totalizers are allotted to the different transactions, they may, if desired, be utilized to segregate the sales pertaining to different departments or clerks, etc. A grand totalizer is also provided and the elements of this totalizer may be moved into engagement with the actuating racks each time certain of the transaction totalizers are rocked into engagement with the actuators. Provision is also made whereby when an amount is entered in either of the totalizers appropriated to the paid-out and received-on-account keys this amount will not be entered in the grand totalizer, so that the latter will only accumulate amounts representing the amount of the new sales performed during any arbitrary period.

A manipulative device forming a part of the total-recording mechanism is capable of being adjusted to three different positions. This manipulative device when in its normal position controls the machine so that the items may be entered upon the various totalizers. When this device is in a position designated "read" the totals standing upon any of the transaction totalizers or upon the "grand" totalizer may be obtained and printed without resetting the totalizer. Taking the total standing upon the cash totalizer is effected by simply moving the total lever to the "read" position, and since this releases the machine for operation the crank handle may be turned, which results in printing the amount standing on the cash totalizer upon the record strip.

Printing totals from the grand totalizer and the remaining transaction totalizers is performed by depression of the related key followed by a subsequent operation of the crank handle. Depression of the grand total key or one of the transaction keys serves to release the machine during totaling operations only and for the first totaling operation no key need be depressed so that the total of the cash totalizer may be automatically taken.

When the machine is conditioned for total-taking by movement of the manipulative device to the "read" position the timing of the engagement of the totalizer pinions with the actuators will be so regulated that the desired totalizer will be moved into and out of mesh with the actuating segments for the purpose of permitting the segments to rotate the totalizer elements in both directions, thus permitting the amount to remain on the totalizer.

When the total lever is moved to the position designated "reset" the machine is conditioned so that the recording of the totals of any of the transaction totalizers and the grand totalizer may be permitted along with the resetting of the totalizer, and in this instance the totalizers are moved into mesh with the actuating segments for permitting the segments to rotate the totalizers in only one direction so that after the amount standing upon the selected totalizer has been subtracted therefrom the totalizer then will be disengaged from the rack and the totalizer pinions consequently will remain in their zero positions.

In addition to the above described devices, the machine is also provided with an error key whereby in the event that an error should have been made in the depression of one of the keys in the amount or transaction bank, the same may be rectified without a further operation of the machine. The error or release key is so arranged in cooperation with the clerk's bank of keys that it may not be operated after the machine has been released for operation by the depression of a clerk's key.

Furthermore, in order to insure proper operations of the machine various other interlocks and cross connections are provided for the following purposes: to prevent movement of the total lever out of its adjusted position after the operation of the machine has commenced; to effect the release of any of the previously depressed amount or transaction keys prior to a movement of the total control lever to the "read" or "reset" position; for normally locking the "grand total" key when the machine is conditioned for item-entering operations; and for releasing it when the control lever is moved out of the adding position and simultaneously locking the "no sale" key since the latter is not employed in total-taking operations.

The usual forms of key stops are provided for preventing the depression of more than one key in a bank and connecting mechanism is employed for locking the amount and clerks' keys when the total lever is moved out of the adding position.

The general organization and operation of the machine as a whole having been thus outlined the preferred construction of the various parts referred to will now be described in detail.

DETAILED DESCRIPTION

Frame work

Figure 5:
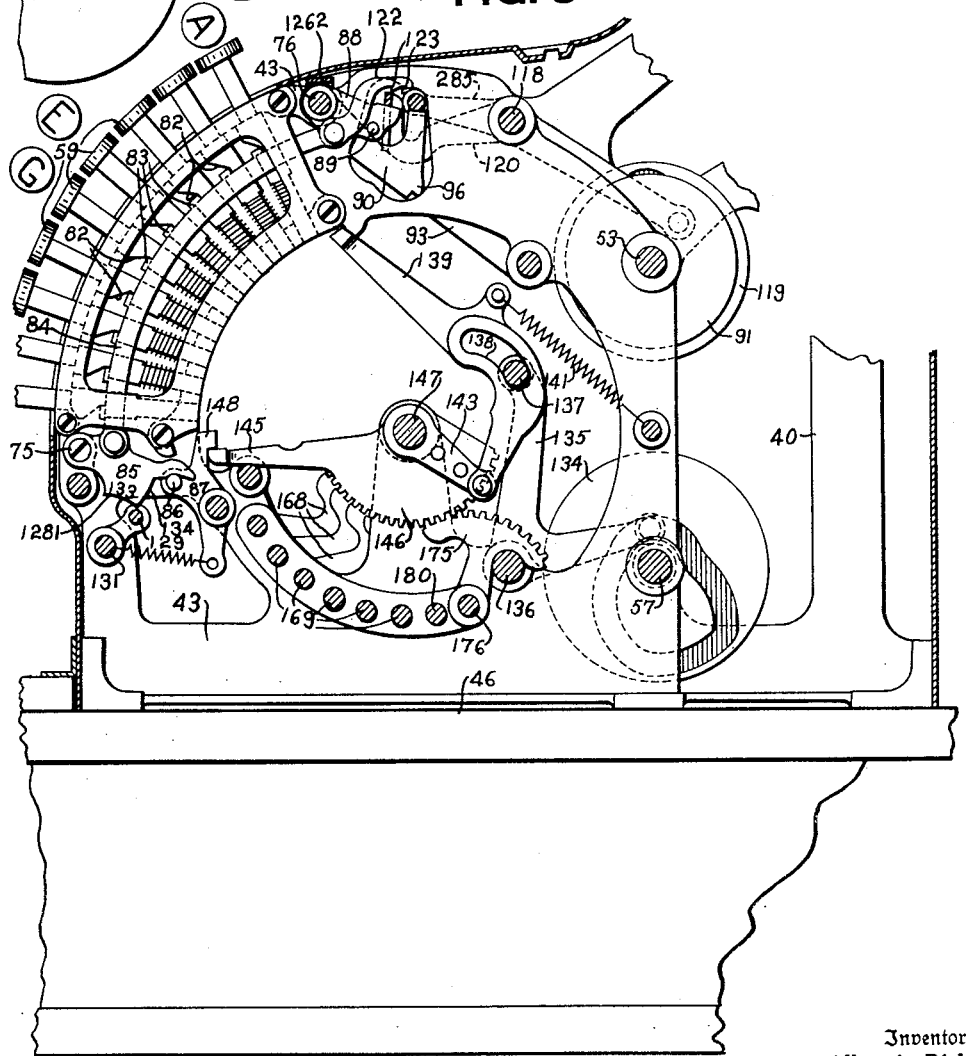
Fig. 5 is a transverse sectional view somewhat similar to Fig. 2 but taken alongside of the clerk's bank of keys and shows in detail these keys and their associated differential mechanism.

In Figs. 4 and 6 is disclosed the relative arrangement of some of the members comprising the frame work of the machine from which it will be noted there are provided main side frames 40 and 41 between which are intermediate frames 42, which at their front portions comprise the supporting means for the amount keys and associated devices. In addition to these frames there is also provided a frame 43 to support the clerk's bank of keys while the frame 41 supports the transaction bank of keys. To give strength and rigidity to the frame work the various members are held together by transverse shafts which may at the same time either serve as the operating shafts for the machine or supporting means for some of the elements. To the right of the frame 41 are frames 44 and 45 for supporting the totalizers and printing devices. All of the frames just referred to rest upon and are attached to a base 46 (Fig. 5).

As best shown in Fig. 1 the machine is enclosed by a cabinet 47 which may be made of any desired material, the cabinet being provided with a series of slots to receive the operating keys and the total controlling device. The printing and associated mechanisms are concealed by means of a hinged cover 49.

Operating mechanism

To impart power to the various mechanisms of the machine, there is provided a manually operated crank handle 50 (Figs. 4 and 8) loosely mounted upon a stub-shaft attached to the frame 45, the handle having attached to it a gear 51 meshing with a larger gear 52 attached to a driving shaft 53. The gear 52, which is twice as large as the gear 51 meshes with an idler gear 54 loosely mounted upon a stud 55 projecting from the frame 45. The gear 54 meshes with a gear 56 rigidly secured to a second driving shaft 57. The shafts 53 and 57 are the driving shafts of the machine and carry cams and other devices for operating the various parts of the mechanism, as will be described in detail later in the specification.

The drawings show the machine as it would appear when provided with a manually operated crank for the purpose of operating it, but it is also intended that the machine may be provided with an electric motor and clutch to connect the motor with either of the driving shafts 53 or 57 and for this purpose any well known electric driving device may be used such as that shown in the United States patent to Kettering and Chryst No. 1,144,418, issued June 29, 1915.

Keyboard

The keyboard (Fig. 1) comprises four banks of amount keys 58, a single bank of clerk's keys 59 and four transaction keys, namely, a received-on-account key 63, a no-sale key 64, a charge key 65 and a paid-out key 66. There is also provided a total control lever 61 located above the clerks' keys and a special key 62 located in the transaction bank but designated as a grand total key; both of these manipulative devices may be active for controlling the machine when performing certain totaling and resetting operations.

Amount keys

The construction and mounting of each of the amount key banks 58 are identical. The bank illustrated in Fig. 2 being taken as representative of these four banks. The stems of the amount keys 58 fit in radial slots formed in their supporting frames 42, the stem of each key being surrounded by a spring 68 to return and retain the key to its outer or normal position. Each key has an inclined edge 69 and a notch 70 adapted to cooperate with lugs 71 integral with a key detent 72. The detent 72 of each bank is supported at its lower and upper ends respectively by arms 73 and 74, the arm 73 being pivoted to the key frame by a screw 75 while the arm 74 is loosely pivoted upon a transversely extending rod 76. Each detent 72 serves to temporarily retain a key in its bank in depressed position since it will be obvious that when a key is depressed the inclined edge 69 engaging the lug 71 will rock the detent 72 downwardly until the key has been depressed sufficiently to bring the lug 71 into cooperation with the notch 70 and since the detent 72 then springs slightly upwardly under the action of a spring 77 the lug 71 will engage the notch 70 of the key and hold the latter depressed against the compression of the spring 68.

The arm 73 has an extension 78 engaging the pin 79 carried by a zero stop pawl 80 so that when the detent is lowered the engagement of the extension 78 with the pin 79 will disable the zero stop pawl 80 for the differential mechanism and since the key is held in locked position the zero stop pawl 80 will be retained in its disabled position as long as the key is held depressed.

Clerks' keys

The bank of clerks' keys 59 is shown in Fig. 5 and while it is constructed somewhat similar to the key banks already described it nevertheless contains an element not found in the amount key banks, through the medium of which it is capable of additional functions. The keys 59 are mounted in the frame 43 and by reference to Fig. 1 it will be seen that these keys reading from the top bear upon their projecting operating heads initials such as A, B, . . . L, and M, representing the different clerks employed in the establishment for which the machine is designed. It is apparent that whenever desired a lesser number of keys may be placed in this bank, generally determinable by the number of clerks who are to use the machine.

All of the clerks' keys are provided with inclined edges 82 (Fig. 5) as well as notches adapted to cooperate with lugs 83 carried by a detent plate 84 which at its lower end is pivoted to an arm 85 whose extension cooperating with a pin 86 disables a zero stop pawl 87 just as described in connection with the amount key banks. The upper end of the detent plate 84 is carried by an arm 88 having a pin 89 (Fig. 4) which extends laterally a sufficient distance to overlie an arm 90 loosely mounted on the shaft 76. The clerks' keys have the additional function of releasing the machine and the machine cannot be operated by the crank handle for entering items unless one of these keys is depressed. The clerks' keys in addition to being releasing keys for the machine also control a type wheel by means of a differential mechanism to be hereinafter described, and it is sufficient here to state that no one can operate the machine without depressing a clerk's key and by means of the printing mechanism the necessary information is given as to which clerk has been employed to release the machine.

*Machine locks*

The means whereby the crank handle is normally locked against operation but released upon depression of one of the clerks' keys is best shown in Fig. 10. It will be noted that secured to the driving shaft 53 is a disk 91 having a shoulder normally engaging a lug 92 of an element slidably mounted in a bell crank 93, the lug being normally urged into cooperative relationship with the shoulder of the disk 91 by a spring 94 and a spring 95 connected to the bell crank 93. As previously stated, the arm 90 is loose on the shaft 76 and has a shoulder 96 adapted to coperate with a spring-pressed pawl 97 carried by the bell crank 93. A spring 98 urges the arm 90 against the stud 89.

From the construction just described, it will be self-evident that when a clerk's key is depressed the pin 89 will rock the arm 90 counterclockwise (Fig. 10) so that the shoulder 96 cooperating with the pawl 97 will rock the bell crank 93 counterclockwise against the tension of the spring 95. This will result in the disengagement of the lug 92 from the shoulder of the disk 91 so that the spring 94 will urge the lug 92 upwardly enough to carry it out of line with the shoulder on the disk. When the shoulder 96 is disengaged from the pawl 97 the spring 95 will be effective to rock the bell crank reversely so that the lug 92 rests upon the periphery of the disk, thus leaving the shaft 53 and crank handle 50 unlocked for operation.

*Transaction key bank*

Figure 7:
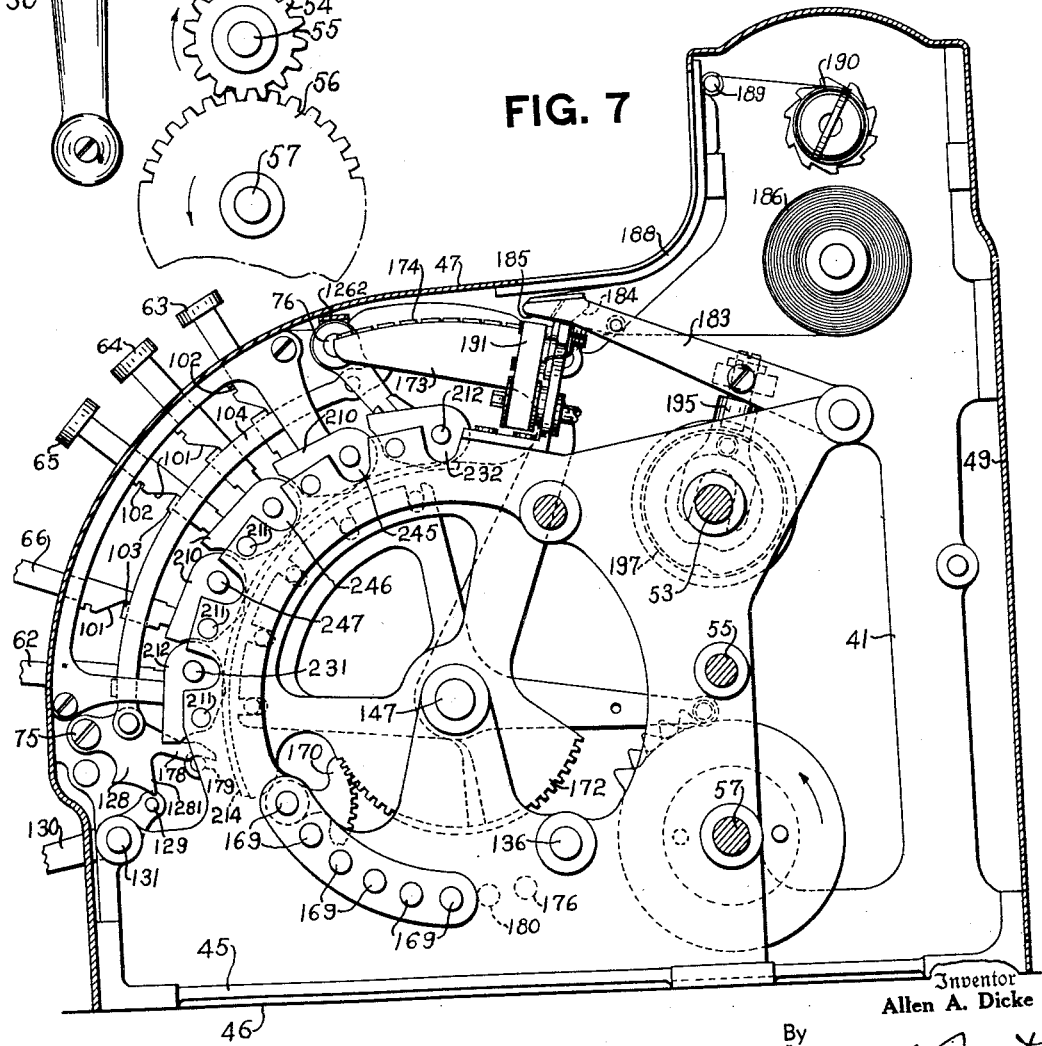
Fig. 7 is an elevation of the right hand side of the machine showing details of the clerk's key bank, the multiple totalizers and the printing mechanism for printing items and totals.

As previously stated, the transaction keys 63, 64, 65 and 66, and the grand total key 62 are all located in one bank (Fig. 7). Each of the key stems is provided with an inclined edge 101 and a notch 102 adapted to engage a lug 103 integral with a detent plate 104, similar to the detent plates 72 and 84 described in connection with the amount and clerks' key banks, respectively. By this means the transaction keys are held temporarily depressed, and when any key is depressed, a zero stop pawl 80 (Fig. 9) is disabled in the usual manner.

*Single key mechanism*

It is desirable to provide means to prevent a depression of more than one key in a bank, since this would probably result in the disarrangement of the mechanism and a confusion in the printed record. To this end there is loosely pivoted upon the clerk's key frame 43 (Fig. 10) a series of key stops 99 of the usual form, adapted to cooperate with pins 100 carried by each of the stems of the clerks' keys. The pendents 99 are so arranged that sufficient room is provided to permit the passage of only one of the pins 100 of one of the key stems so that when a key in one bank is depressed the upper edges of the pendents will by engagement with the pins 100 of the undepressed keys lock them against operation.

A somewhat similar construction is provided for each bank of amount keys 58 and while this mechanism has only been shown and described in connection with the clerk's bank it is to be understood that the construction shown and described should be taken as representative of all of the amount banks of keys as well.

Intermediate the five keys of the transaction banks are also located key stops 106 (Fig. 9) which serve in the usual way to prevent depression of more than one key in this bank. Attention is directed to the fact that the grand total key 62 is equipped with a pin 107, which normally in item-entering operations is in locking relationship with a projection 108 of a plate 109 pivoted at its lower end to the transaction bank key frame by an arm 110 and pivoted to the transaction key bank frame at its uper end by an arm 111 secured to the shaft 76.

*Lock for operating key*

After the machine has been released and partially operated it is desirable to lock all of the keys in all banks of the machine during the operation of the machine, this applying not only to banks in which keys have been depressed but in banks in which no keys have been depressed.

As best shown in Fig. 2, the detent plate 72 associated with the amount key bank has an extension 112 having notches 113 and 114 adapted to cooperate with a bail 115. As best shown in Fig. 4 the bail 115 comprises a transversely extending bar attached at opposite ends to a pair of bell cranks 116 and 117 loosely mounted at their mid-portion upon a transverse shaft 118. The rear arms of the bell cranks 116 and 117 are provided with rollers engaging the cam slots of box cams 119 (Figs. 2 and 9) attached to the driving shaft 53. To provide strength and rigidity to the frame, the bail 115 at its mid-portion has attached thereto an arm 120 (Fig. 4) which is also loosely mounted upon the shaft 118.

As can be seen in Fig. 5 the detent 84 associated with the clerk's key bank has an extension 122 having notches 123 adapted to cooperate with the bail 115 and similarly, referring to Fig. 9, the detent associated with the transaction bank has an extension 124 with notches 125 also adapted to cooperate with the bail 115.

When a key is depressed the detent of that particular bank is forced downwardly, thus bringing the rearmost notch into position to cooperate with the bail 115, but if a key in any bank has not been depressed, the detent remains in its normal position wherein the bail 115 will be in cooperative relationship with the foremost notch. When the machine is partially operated the cam slot in the cam 119 rocks the arms 116 (Fig. 2) slightly downwardly thus raising the bail 115 so that it will engage either the foremost or rearmost notch thus holding all the detents in latched positions thereby preventing a depression of additional keys or the release of those keys which have been depressed in the different banks. This makes it clear that the amount keys may be depressed in conjunction with any desired transaction keys, and that upon depression of one of the clerks' keys the machine is released so as to permit actuation of the operating mechanism, and that by a partial movement of the latter, all the keys in all the banks are locked against operation.

Release of the keys at the end of an operation of the machine by the operating mechanism At or near the end of an operation of the machine it is necessary to release those keys which have been previously depressed and in the illustrated embodiment the release of the keys is effected by the same member which locks them during an operation of the machine. Loosely mounted upon the shaft 76 is an arm 126 (Fig. 2) which is adjacent the detent plate of the amount key bank and is connected to the upper end of the detent 72 by a pin 127 which is used as the connecting means between the arm 74 and the detent. If desired the arm 126 may be formed as an integral extension of the arm 74. By the connection just described it will be noted that when the detent plate is moved downwardly by the depression of a key the arm 126 also moves downwardly. At a certain point in the operation of the machine the cam 119 gives a downward movement to the bail 115 so that it strikes the arm 126 and rocks the detent 72 downwardly sufficient to disengage the lug 71 from the notch 70 of the depressed key and permit the spring 68 to return the key to its normal position.

As shown in Fig. 4 a series of arms 126 are provided, one for each bank of amount keys. In respect to the clerk's key bank the arm 88 which it will be remembered is a part of the train of mechanism for releasing the machine for operation, also lies under the bail 115 and serves to release the depressed clerk's key at the end of an operation of the machine in the same manner described for the amount keys. In respect to the transaction key bank an arm 1263, Figs. 4 and 17, likewise lies under the bail 115 and performs the same function.

As previously stated, the arm 90 (Fig. 10) is moved by the pin 89 a sufficient extent to cause the shoulder 96 to escape the shoulder on the pawl 97 so that the spring 95 may rock the bell crank 93 and cause the projection 92 to rest on the periphery of the disk 91. As the arm 90 is permitted to rise upon the release of the clerks' keys it will rock the pawl 97 idly about its pivot until the shoulder 96 is again above the shoulder on the pawl. The construction just explained serves to prevent an operator from holding the locking bell crank 93 in released position by accidentally or intentionally holding the clerk's key depressed at the moment when it should be released and returned to normal.

Error key

An improved type of key releasing device is employed whereby if the operator should depress a key in error the same may be returned to its normal position without requiring an operation of the machine.

Each arm 73 which is connected to the amount key detent 72 has an extension 128 (Fig. 2). When an amount key is depressed and latched the extension 128 will be located in front of a rod 129 which as shown in Fig. 6 extends transversely in the machine and is supported by arms 130 rigidly attached to a horizontal transverse shaft 131 to which is attached a key lever 132 which as shown in Fig. 1 projects through the machine cabinet so as to be readily operable. When the error key 132 is depressed the shaft 131 will be rocked counterclockwise (Fig. 2) so that by the cooperation of the rod 129 with the extensions 128 of the detent plate supporting arms, which have been operated by virtue of depression of certain keys in various banks, the detents will be rocked still further downwardly and disengage the lugs 71 from the notches 70 of the depressed keys thus permitting the key return springs 68 to return those depressed keys to their normal positions.

Substantially the same form of releasing connection between the error key 132 and the detent associated with the transaction bank of keys (Fig. 7) is provided so that if a key in this bank should have been depressed in error the mistake can be rectified prior to a further operation of the machine by the crank handle, it being understood that the rod 129 is of sufficient length to engage the extensions 128 related to the amount and the transaction key banks.

It is advantageous to lock the keys of the banks in which no keys are to be returned while the error key is operated. To this end the extensions 128 related to the amount and transaction banks as well as the corresponding extensions 133 for the clerks' bank have their lower edges 1281 concentric with respect to the shaft 131. While the error key is being operated the rod 129 will coact with these concentric edges to lock the extensions and detents of the unoperated banks against movement by the depression of a key until the error key is returned to normal.

It will be noted, however, from an inspection of Fig. 5 that the extension 133 which is integral with the arm 85 connected to the clerk's detent 84 is different from the corresponding extensions 128 of the amount and transaction key banks. The extension 133 is in the case of the clerk's key bank provided with an edge 134 concentric with respect to the pivotal point 75 of the arm 85 so that when a clerk's key has been operated to release the machine for operation the concentric edge 134 will pass in front of the rod 129 thereby locking the shaft 131 against counterclockwise movement by depression of the error key 132. Thus it will be noted that any fraudulent operation of the machine, such as the release of the keys after the machine has been released for operation will be completely prevented.

The result of the construction just described is that should a mistake be made in the depression of the keys in the machine, the same may be corrected before the machine is released for operation by manipulating the error key 132, but after the operating handle has become unlocked the error key becomes locked so that the keys may not be released except by completing the operation of the machine, permitting the regular release of the keys through the bail 115 and arms 88, 1263 and 126.

Differential mechanism

The differential mechanism of the machine is employed to operate the totalizers, to select them for operation, and also set the type carriers in the printing mechanism under control of the banks of amount, transaction and clerks' keys.

The differential mechanism controlled by the amount keys comprises a plurality of sections, one of which is provided for each bank of keys 58 and is clearly shown in Fig. 2. Attached to the driving shaft 57 is a box cam 134 the cam slot of which cooperates with a roller carried by the rear arm of a bell crank 135 loosely mounted on a transverse shaft 136. It will be noted from Fig. 6 that the shaft 57 carries two cams 134, each of which cooperates with its associated bell crank 135 and between the ends of the bell crank is extended a universal bar or rod 137. When the shaft 57 is rotated in the direction of the arrows shown in Fig. 2 the bell crank will remain substantially stationary for a partial movement of the shaft 57 after which the cams rock the bell crank 135 and rod 137 forwardly to gradually increasing extents. After the maximum movement has been given to the rod 137 the latter will remain substantially stationary during another portion of the continued movement of the shaft 57. The movement given to the rod 137 during the remainder of the movement of the shaft 57 is substantially a counterpart of the first portion of the movement. This will result first in holding the rod shifted and then giving it a return slightly beyond its normal position and finally after it has remained substantially idle for a while it will be brought to normal position. The return movement of the rod serves to actuate the differential mechanism of the machine, which will now be described in detail.

The universal rod 137 is adapted to cooperate with a cam slot 138 in a floating lever 139 the forward end of which is adapted to cooperate at the desired time with the stem of the depressed key, but it is normally retained by a spring 141 in the position shown in Fig. 2, abutting against a projection 140 of the frame 42. The lever which is in the form of a cam member is pivoted by a pin 142 to an arm 143 secured by pins 144 to a complementary movable lever 145 which has integral therewith a segment plate 146 loosely mounted upon a fixed pivot 147 which in the illustrated embodiment comprises a transverse supporting shaft mounted in the various side and intermediate frames in the central part of the machine. The forward end of the lever 145 is normally in engagement with the lower edge of a nose 148 projecting from the zero stop pawl 80 while the forward end of the lever 139 is normally in such a position that when the uppermost key, which is the key of highest value in the bank is depressed it is substantially in contact with the rear side of the inner end of this key.

The operation of the differential mechanism is as follows: When a key is depressed the zero stop pawl 80 is rocked forward so that its nose 148 is carried away from the shoulder of the lever 145 and as previously described, the zero stop pawl will be retained in its disabled position. When the crank handle 50 is operated the shaft 57 is rotated and such movement rocks the bar 137 about the shaft 136 and this movement of the rod 137 is adapted to move the levers 139 and 145 complementally, the extent of movement imparted to each member being dependent upon the key depressed. The spring 141 will be given sufficient tension to hold the lever 139 at normal until the companion lever 145 has been moved. When the shoulder of the lever 145 engages the inner end of a depressed key further movement of that lever is prevented and movement of the lever 139 continues until its shoulder reaches the inner end of the depressed key.

For example, if the "8" key has been depressed the inner end of the stem of that key will be moved in the path of the complementally movable levers 139 and 145 and as the machine is operated the rod 137 may first cause the lever 145 to pivot around the shaft 147 and move its other end upwardly until its shoulder engages the stem of the depressed key. During this movement the lever 139 tends to pivot about its upper end in contact with the projection 140 so that the pin 142 serves to transmit the motion of the rod 137 to the arm 143. If the rod 137 continues its movement around the pivotal point 136 it cannot impart a further upward movement to the lever 145 due to the contact of the latter with the end of the depressed key so that the rod will now by its cooperation with the lower edge of the cam slot 138 cause the lever 139 to be rocked counterclockwise about its connection 142 with the arm 143 until the shoulder of the lever 139 engages the rear or upper side of the "8" key stem. The movement which is given to the segment plate 146 and lever 145 will therefore be of eight units in length while a complementary movement of one unit will be given to the lever 139. When a "4" key is depressed the segment plate 146 will be given four steps of movement and the lever 139 five steps of movement.

If the machine is operated with no key in the bank depressed the zero stop pawl for that bank remains in its operative relationship with the lever 145 so that the latter will not move while the lever 139 will be given nine steps of movement. This merely results in rocking the lever 139 downwardly about its pivotal point 142 during the first half of the operation of the cam 134 and returning it the second half of the operation with a result that no movement will be given to the segment 146. At the end of the first half of the operation the parts will be in the positions shown in dotted lines in Fig. 2.

Summarizing therefore, it will be noted that the segment plate 146 will be given a differential movement during the first part of the operation of the machine and will be returned the same differential distance during the last half of the cycle of operation these movements being utilized to adjust the printing segments and operate the totalizing mechanism.

Attention is called to the fact that the formation of the cam slot 138 in the floating lever 139 is such that when the levers 139 and 145 are brought together on opposite sides of the depressed key or of the nose 148 of the zero stop pawl 80 the curvature of the slot 138 will be concentric with the fixed pivot of the segment plate 146. Furthermore, at this time a concave forward edge 139I (Fig. 2) of the lever 139 will always be brought into contact with the hub portion of the segment 146.

There is provided a differential mechanism of a type identical to that just described for each bank of amount keys (Fig. 6) the same reference characters being applied to like parts. To the left of the hundreds of dollars bank of amount keys are two differential mechanisms for which no depressible keys are provided. The differential mechanism of these two orders are utilized for the purpose of total-taking and resetting, thus permitting printing of amounts higher than that represented by the value of the keys on the keyboard.

A differential mechanism of substantially the same construction is also provided for the clerk's bank of keys as best shown in Fig. 5, which is for the purpose of adjusting the clerk's type carrier.

The elements comprising the differential mechanism associated with the transaction banks of keys are best shown in Fig. 13 and their differences over the corresponding elements of the amount differential will be pointed out later. The transaction differential is not only utilized for the purpose of adjusting a type carrier but also for selecting a totalizer for operation.

*Printing mechanism*

The printing mechanism will be but briefly described.

To adjust the type carriers differentially each plate 146 (Fig. 2) associated with the amount key differential mechanism meshes with a segment 168 attached to one of a series of parallel shafts 169 each shaft having rigidly secured to it toward one end a segment 170 (Fig. 6) which as shown in Fig. 15 meshes with a segment 172 loosely mounted upon the shaft 147. This segment 172 has a segmental arm 173 carrying type 174 for printing the characters "0" to "9" inclusive. The same sort of connection is provided between each segment plate 146 of an amount differential mechanism to a corresponding amount printing type arm 173 so that during the first half of the operation of the machine, at which time the plate 146 is moved differentially each of the arms 143 will be moved rearwardly a distance commensurate with the amount key depressed in its related bank, and when a platen is operated an impression will be made on the record material denoting the amount entered in the machine.

The segment plate 146 (Fig. 5) associated with the clerk's differential mechanism meshes with a segment 175 attached to a shaft 176 which is provided at its opposite ends with a segment 177 (Fig. 6) meshing with teeth (not shown) on the lower part of a type arm 178 (Fig. 4).

The segment plate 146 associated with the transaction differential meshes with a segment 179 (Fig. 13) secured to a shaft 180 which extends transversely in the machine and which has secured thereto a segment 181 (Fig. 6) meshing with a segment arm 182 (Fig. 4) carrying type representing different transactions. As best shown in Fig. 4 the type arms 173, 178 and 182 are adjacent each other and normally positioned beneath a platen.

The platen, as best shown in Figs. 4, 7 and 15 comprises two arms 183 connected by a crosshead 184 carrying a rubber impression block 185 which extends above all of the printing segments.

The record material is fed from the supply roll 186 (Fig. 7) and is drawn forwardly underneath the impression block 185 and over the same and then rearwardly under a curved glass 188, over a roller 189, and onto a storage roll 190.

An inking ribbon 191 is provided to make the printing on the record strip legible.

A pitman 195 connected to the arms 183 and operated by a box cam 197 at the proper time during the operation of the machine lowers the block 185 to carry the record strip in contact with the type to print on the strip.

*Multiple totalizers*

The present machine is provided with five totalizers, namely, received-on-account, charge, cash, paid-out and a grand totalizer.

Since the construction of the several totalizers is identical a description of one will suffice and as they have been fully illustrated and described in detail in the parent application only so much of them will be herein described as is necessary for an understanding of this divisional application.

Each totalizer is supported in a frame 210 (Figs. 7 and 13) journaled between the frames 44 and 45 on pins 211. Each totalizer frame 210 has a supporting shaft 212 carrying a plurality of totalizer pinions 213 (one of which is shown in (Fig. 15). There are a sufficient number of differential devices for the accumulating section of the machine for six denominational orders and there are also a corresponding number of totalizer pinions 213. To actuate the totalizer pinions each of the previously described segments 172 carries a rack or actuator 214. The journal pins 211 are the pivotal points of the totalizer frames which are adapted to be rocked about these points to bring the pinions 213 into mesh with the racks 214. The racks 214 are of sufficient length to be common to and cooperate with the pinions of each of the five totalizers as is particularly shown in Fig. 15.

As shown in Fig. 13 there is attached to each shaft 212 an arm 215 which slides in a radial slot formed in the totalizer supporting frame 45. Each arm 215 has a slot 216 substantially concentric with the center of the shaft 147. The differential mechanism for the transaction key bank as already explained comprises the levers 139—T and 145—T similar to those described in connection with the amount key differential it being noted, however, that the universal bar 137 (Fig. 6) is not of sufficient length to cooperate with the slot 138 of the lever 139—T related to the transaction differential mechanism and that a stud 220 is provided for this purpose. The stud 220 is carried by an arm 221 (Figs. 6 and 9) integral with which is an arm 222 carrying rollers 223 and 224 (see also Fig. 11).

In the normal item-entering operation the roller 223 engages a slot in a box cam 225 secured to the shaft 57 (Figs. 6 and 12). By referring to Fig. 12 it can be seen that the configuration of the slot in the box cam 225 which is effective during item entering operations (the various portions being designated by the reference character 226) is different from the cam slot in the box cam 134 (Fig. 5) for operating the amount and clerk's differential mechanism and it is noted therein that the pin 223 during the first movement of the driving shaft 57 will dwell a longer time than the rod 137. In normal "add" operations the levers 139 and 145 of the amount and clerks' differential mechanisms will move toward each other prior to any movement of the corresponding members 139—T and 145—T of the transaction differential mechanism and substantially at or just prior to the time that the levers 139 and 145 of the amount differentials close upon the opposite sides of a depressed key, a portion of the cam slot 226 will be effective to begin to rock the arm 222 so that as it continues it will rock the stud 220 (Fig. 13) downwardly thereby forcing the associated levers 139—T and 145—T to close upon each other. It will be understood that the levers 139 and 145 of the amount differential devices will at this time have been properly positioned and remain in such position, it also being clear that the operating segments 214 are stationary at this time. This timing relation is necessary since it is desirable to first differentially adjust the actuating racks 214 and then while they are stationary to differentially move the levers 139—T and 145—T of the transaction differential mechanism so that the desired totalizer will be engaged with the differentially positioned racks 214, the latter then being restored to their normal positions to effect adding in the selected totalizer while the pinions remain engaged therewith.

To select the cash totalizer for operation it is only necessary to depress the desired amount keys and a clerk's key to release the machine for operation, final operation being performed by operating the crank handle 50 as previously described. It will be noted from Fig. 13 that the differentially movable lever 139—T has a pin 227 and that pivotally mounted by a pin 217 upon the lever 145—T is a cam 228 having a lug 229 and a slot 230. A coil spring 218 tends to rock the cam 228 clockwise but is prevented by the cooperation of the forward edge with an integral projection 219 of the lever 145—T (Fig. 14). Fig. 13 shows the parts in their normal positions prior to an operation for entering an item in the cash totalizer 231. After the operation of the machine has been commenced the stud 220 is rocked about the shaft 136 and since no key has been depressed in the transaction bank the zero stop pawl remains in its normal or effective position and prevents any movement of the lever 145—T so that the lever 139—T will be rocked downwardly until the pin 227 enters the cam slot 230 in the cam 228. In the normal positions of the parts the lug 229 is already in engagement with the slot 216 of the arm 215 related to the cash totalizer 231. As the pin 227 enters the slot 230 it positively rocks the cam 228 counter clockwise (Fig. 13) about its pivot 217 and by the cooperation of the lug 229 with the slot 216 it will rock the cash totalizer about its journal pin 211 to engage the pinions 213 with the racks 214 which at this time have been positioned differentially and are now being held stationary.

As the machine is further operated the racks 214 will be restored to their normal positions with the result that the differential movement previously given thereto will be transmitted to the pinions 213 of the selected and engaged totalizer. During this time the cam slot 226 (Fig. 12) is effective to retain the pinions in mesh with the racks 214.

After the racks 214 have assumed their normal positions the arm 222 (Fig. 13) is rocked reversely resulting in moving the stud 220 clockwise the initial movement of which by the disengagement of the pin 227 from the cam slot 230 results in the disengagement of the pinions 213 from the racks 214, continued operations of the machine serving to restore the transaction levers 139—T and 145—T to their normal positions.

As previously stated a grand totalizer 232 (Fig. 13) is to have all cash sales added thereto. The shaft 212 of the grand totalizer 232 has an arm 215—G which is not slotted at its lower end but has a pin 233 engaging a slot 234 of a plate 235 the latter being slotted at 236 to engage the shaft 147. The plate 235 is urged to its normal or upper position by a spring 237 bearing against the shaft 147 and fitted into a socket formed in an extension 238 of the plate 235. This plate 238 has a plurality of projections 240, 241 and 242 normally engaging a pin 243 attached to the cam 228.

From this description it can be seen that when the pin 227 passes in the slot 230 of the cam 228 the latter will be rocked counter clockwise to bring the cash totalizer into mesh with the racks 214 and by the cooperation of the pin 243 with the extension 242 will rock the plate 235 downwardly it being guided by the slot 236 engaging the shaft 147 and this downward movement of the plate 235 through the cooperation of the slot 234 and pin 233 force the arm 215—G inwardly, thus bringing the grand totalizer pinions 213 into mesh with the racks 214 so that the grand totalizer will have simultaneously accumulated thereon the same amount as is entered in the cash totalizer 231.

To prevent the totalizers from accidentally falling into mesh with the racks 214 by virtue of their weight or to prevent them from being improperly forced into operative relationship with the racks, there is provided a novel locking device which will now be described.

As shown in Figs. 13 and 14 the pin 217 which is carried by the lever 145—T and which is the pivotal point of the cam 228 extends laterally and projects into a supplemental plate 244 loosely mounted upon the shaft 147, the periphery of the plate 244 being concentric with the center of the shaft 147. By means of the connecting pin 217 the plate 244 partakes of the same movement as the lever 145—T and the cam 228. Therefore it can be seen from Fig. 13 that the downward extensions of the arms 215 related to the received-on-account totalizer 245, the charge totalizer 246, the paid-out totalizer 247, normally rest upon the periphery of the plate 244 thus preventing those totalizers from being rocked about their pivotal points. The pinions of the grand totalizer 232 are normally spring-held against being rocked into cooperative relationship with the racks 214 by the cooperation of the pin 233 with the slot 234 of the spring-urged plate 235. The cash totalizer 231 is normally spring-held in its outer position under the action of the springs 218 and 237 by the cooperation of the pin 243 with the projection 242 of the plate 235.

It will be noted, however, that the segment plate 244 has a notch 248 normally positioned over the rear end of the arm 215 associated with the cash totalizer 231 so that there will be no interference when this totalizer is drawn into mesh with the racks 214 upon operation of the machine. To lock and unlock the grand totalizer at the desired time there is attached to the plate 244 a supplemental plate 250 having notches 251, 252 and 253, the rearmost notch 251 being normally positioned under the lower end of the arm 215—G related to the grand totalizer, thereby permitting this totalizer to be normally drawn into mesh during a cash operation.

When it is desired to enter an amount in the machine which represents a paid-out transaction the desired amount keys are depressed and in addition the paid-out key 66 is depressed, the machine then being released by a clerk's key and finally operated by operation of the crank handle 50. When the paid-out key 66 is depressed the zero stop pawl 80 is disabled as previously described.

When the handle 50 is operated the shaft 57 rocks the stud 220 forwardly (Fig. 13) which results in first rocking the lever 145—T upwardly, due to the retarding action of the spring 141 connected to the lever 139—T until the extreme forward end of the lever 145—T cooperates with the stem of the paid-out key 66 at which time the pin 243 of the cam 228 is brought out of cooperative relationship with the projection 242 so that when the lever 145—T strikes the stem of the paid-out key the pin 243 will be positioned over a portion of the plate 235 between the projections 240 and 241. When the cam 228 is moved upwardly by the lever 145—T the lug 229 will be disengaged from the stud 216 of the arm 215 related to the cash totalizer 231 and will then engage the slot 216 in the arm 215 associated with the paid-out totalizer 247. Since the segment plate 244 moves simultaneously with the lever 145—T the notch 248 will be positioned in the rear of the end of the arm 215 of the paid-out totalizer so that when the lever 239—T moves downwardly the pin 227 will enter the slot 230 with the result that the arm 215 will be drawn downwardly, rocking the pinions of the paid-out totalizer 247 into mesh with the racks 214 which are then stationary. Since the lower end of the arm 215 of the paid-out totalizer registers with the notch 248 there will be no interference between the arm 215 and the plate 244 when the totalizer is drawn into mesh with the rack 214. The pin 243 will, however, be positioned over the cutaway portion of the plate 235 so that while the cam 228 is rocked counter clockwise it will not actuate the plate 235 and the grand totalizer will not be engaged with the rack. It will also be observed that while the notch 248 registers with the lower end of the arm 215 of the paid-out totalizer the periphery of the plate 244 on either side of the notch 248 will coact with the lower end of the arms of the totalizers 231, 245 and 246 so that their pinions may not be intentionally or accidentally forced into engagement with the racks 214.

Counter clockwise movement of the plate 244 also adjusts the plate 250 so that its periphery, instead of a notch, cooperates with the lower edge of the arm 215—G carried by the totalizer wheel shaft 212 of the grand totalizer 232 thereby locking it in its normal position. The paid-out totalizer is meshed with the racks 214 and the racks are then restored to their normal positions so that the paid-out amounts will be entered in this totalizer, after which the levers 139—T and 145—T will be moved away from each other so that the pin 227 engaging the forward edge of the slot 230 positively withdraws the paid-out totalizer pinions from the racks 214.

When it is desired to enter an amount in the charge totalizer the charge key 65 is depressed which results in the engagement of the lug 229 with the slot 216 of the arm 215 associated with the charge totalizer 246 so that this latter totalizer will be engaged with the racks 214 and operated differentially in a manner like that just described. It should also be observed that when the charge totalizer is selected for operation the pin 243 of the cam 228 will be positioned over the lug 240 of the plate 236 so that the grand totalizer 232 will simultaneously receive the same amount entered as that entered in the charge totalizer 246.

Received-on-account transactions are entered in substantially the same manner with the exception that the received-on-account key 63 will be depressed, which results in the engagement of the received-on-account totalizer 245 with the racks 214. When the received-on-account totalizer 245 is engaged with the racks 214 the amount entered therein will not be entered in the grand totalizer 232 since the pin 243 is positioned over a portion of the normal periphery of the plate 235. It will be noted therefore that only in charge and cash transactions the grand totalizer will accumulate all the items entered in the related totalizers, thus giving a grand total of all the new sale transactions.

From the above it is clear that the entering of amounts on the grand totalizer simultaneously with any selected transaction totalizer is dependent upon whether or not a corresponding projection is formed on the controlling plate 235. The absence of such a projection will result in the grand totalizer not being actuated while the presence of a projection will cause it to simultaneously accumulate the same items as the selected transaction totalizer is accumulating. By the present construction a very flexible arrangement is provided to meet the various needs and conditions of different types of businesses in which machines of this class may be employed.

Located in the transaction key bank is a key 64 designated as the no-sale key for controlling certain functions independent of an entry of a sale. No totalizer is provided for this no-sale key and depression of the same followed by a subsequent operation of the machine merely results in the printing of a no-sale designation. When the no-sale key is depressed it serves to stop the levers 139—T and 145—T in a position determined by the stem of the depressed key, the arrangement and location of the key being such that when the complementary movable members are on opposite sides of the same the pin 227 will be engaged with the cam slot 230 of the cam 228 but the lug 229 will not engage any of the slots of the arm 215 of any totalizer and in addition, the pin 243 will register with the cut-away portion of the plate 235 intermediate a pair of projections. Therefore no totalizer will be engaged when a no-sale key is depressed.

Transfer mechanism

Since the transfer mechanism is not specifically involved in the claims of this divisional application it has been thought entirely unnecessary to describe such mechanism herein. If a description of the transfer mechanism is desired reference may be had to the parent application wherein it has been fully illustrated and fully described.

Total-taking mechanism

As previously stated, the illustrated machine is provided with a total lever 61 (Fig. 1) which is normally in the "add" position, in which position the machine is conditioned for accumulating the items entered in one or more of the various totalizers. The total lever 61 may be moved into two other positions designated as "read" and "reset", which in the first instance conditions the machine so that the amount standing upon any of the totalizers may be obtained by printing the total upon the record strip. Movement of the total lever into the "reset" position permits the printing of the amounts standing upon the various totalizers while at the same time the selected totalizers may be reset to zero in successive operations of the machine. It should also be observed that in total-taking and resetting operations the machine is operated by the crank handle 50 as is the case with the regular item-entering operations.

The shank of the total lever 61, as best shown in Fig. 9 is in the form of a square rod 280 connected to a bifurcated member 281, the latter being pivoted to the fixed frame of the machine by a stud 282, it being noted that the upper end of the lever projects through the machine cabinet and is movable in a slot in the cabinet so that it may be placed adjacent the various legends "add", "read" and "reset". The upper end of the rod 280 just beneath the machine cabinet has a segmental portion 283 (Fig. 4) below part of which is an integral cam 284. Since in total-taking operations the clerks' keys are ordinarily not depressed, additional mechanism is provided whereby the total lever 61 will release the machine for one operation when it is moved out of the "add" position while for subsequent totaling operations the various transaction keys will release the machine, and mechanism for accomplishing this function will now be described in detail.

Rigidly secured to the shaft 118 (Figs. 4 and 9) are a plurality of forwardly extending arms 285 carrying a transverse rod 286. The arm 285 on the extreme right has an extension 287 adapted to be engaged by the cam 284 of the total lever so that when the total lever is moved out of the "add" position the rod 286 will be moved downwardly. As will be seen in Fig. 10, the releasing arm 90 has a projection 288 normally underlying the rod 286 so that when the latter is moved downwardly it will through the extension 288 rock the arm 90 downwardly and release the machine for operation in exactly the same manner as the clerks' keys do, as has been previously explained.

As was explained in connection with the operation of the releasing mechanism, when a clerk's key is depressed and the machine operated the arm 90 is given a movement sufficient to cause the shoulder 96 to completely escape the shoulder on the pivoted pawl 97 mounted on the bell crank 93 which permits the latter to be rocked by the spring 95 to again present the locking shoulder 92 in the path of the cooperating notch in the disk 91. During item-entering operations the arm 90 would subsequently be rocked upwardly and in its upward movement would merely idly rock the pawl 97 about its pivot to restore the parts to their normal positions as shown in Fig. 10. During totaling operations, however, the rod 285 remains in its lowest position so long as the control lever 61 is out of the add position and therefore as the bail 115 rises the arm 90 can follow only until the shoulder 288 strikes the rod 286 which is not sufficient to place the shoulder 96 in its normal position over the shoulder on the pawl 97 and the machine will therefore remain locked.

Figure 17:
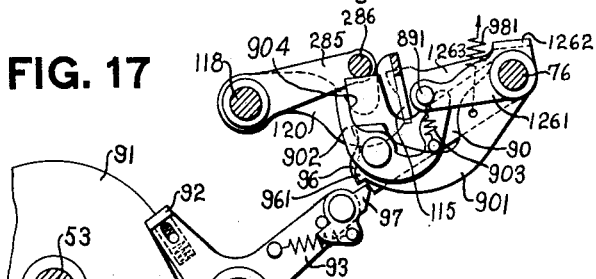
Fig. 17 is a detail of certain machine releasing elements which are effective during totalizing operations.

To avoid the necessity of shifting the control lever 61 back to the add position and then again to the read or reset position for each subsequent totaling operation from the series of transaction totalizers as well as the grand totalizer, another train of releasing mechanism is provided and is placed directly under control of the transaction bank of keys. As shown in Figs. 4 and 17, secondary releasing mechanism comprises an arm 901 adjacent the arm 90 and provided with a shoulder 961 similar to the shoulder 96 and adapted to cooperate with the same pivoted pawl 97 on the locking arm 93. The arm 901 however, is cut away so as not to be in the path of movement of the bail 115 and it is out of the plane of the pin 89 which is operated by depression of the clerk's key. The arm 1263 associated with the transaction bank of keys is connected by a cross bail 1262 to a corresponding arm 1261 which, as shown in Fig. 4 is just to the left of the releasing arm 901. The arm 1261 carries a pin 891 which extends into the plane of a pivoted member 902 carried by the secondary releasing arm 901. The spring 903 attached at one end to an arm of member 902 and at its other end to the pin 891 serves to hold these parts in normal relationship as shown in Fig. 17. It will be recalled that upon the operation of a transaction key the arm 1263 is rocked downwardly and since this is connected by the bail 1262 to the arm 1261 the latter will also be rocked downwardly. The pin 891 will at this time rock the pivoted member 902 idly about its pivot without affecting the arm 901, which is held in its normal elevated position by a spring 981.

During adding operations, therefore, a depression of a transaction key will have no effect upon the locking arm 93 and it will merely serve to rock the member 902 idly upon its pivot. When the control lever 61 is moved out of the add position, however, to either the read or reset position, the rod 286 will be lowered until it is substantially in contact with the surface 904 of the member 902. Now upon subsequent depression of a transaction key the member 902 cannot rock idly about its pivot and as a result when the pin 891 is lowered the secondary releasing arm 901 will be correspondingly moved so that by engagement of its shoulder 961 with the pawl 97 the locking arm 93 will be rocked to releasing position. During the operation of the machine which follows, the bail 115 through its movement of arm 88 will rock the arm 90 and through its movement of arms 1263 and 1261 will rock the arm 901 still further. As the bail 115 rises again the arm 90 will follow only until the shoulder 288 is stopped by the rod 286, but the arm 901 will follow until it reaches its normal position in which the shoulder 961 is again above the shoulder of the pawl 97.

As a result of the construction just described it will be apparent that it is possible to take a single total, say that of the "cash" totalizer, immediately upon movement of the total lever 61 out of the add position, while for subsequent totaling operations the depression of any one of the keys in the transaction bank will serve to release the machine. It is not possible, however, to release the machine by means of a transaction key during item-entering operations.

To prevent any operation of the amount or clerks' keys during total-taking and resetting operations of the machine, the shaft 76 has rigidly secured thereto a rearwardly extending arm 291 (Figs. 4 and 9) which is notched to receive the rod 286. As shown in Fig. 10 there is rigidly attached to the shaft 76 a series of forwardly extending arms 292 which are in the plane of the various key stops 99 and directly in rear of the uppermost key stops. If no keys in any of the banks have been depressed it will be obvious that when the rod 286 is moved downwardly by the total lever 61 as it is moved out of add position the shaft 76 will be rocked counter clockwise bringing the arm 292 back of the rearmost key stops 99 of the amount and clerks' key banks locking all of the keys and thereby preventing a depression of any of the keys as long as the control lever 61 is out of adding position.

The mechanism just described operates conversely as well; that is, if an amount key or clerk's key should have previously been depressed while the total lever is in the "add" position, it will not be possible to move the total lever out of the adding position since the rearmost stop of the clerks' and amount keys are each provided with a notched portion 293 (Fig. 10) which when any of the keys in a bank are depressed will engage the arm 292 thereby locking the shaft 76 against movement, and through the rod 286 preventing movement of the total lever 61 out of the adding position.

It is obvious from the above described construction that if the control lever should be in the "add" position and one of the amount keys should have been previously depressed, it will not be possible to move the lever out of this position, thus requiring the manipulation of the error key to release the incorrectly depressed amount key or keys.

Fig. 16 illustrates a modification of the mechanism which may be employed to automatically release any previously depressed amount keys and to lock the keys of the clerks' and amount banks upon movement of the total lever 61 out of the add position. As will be noted, the arms 126 (Fig. 2) movable with the detent of the amount key banks extend far enough rearwardly so as to underlie the rod 286 and it will be obvious if an amount key has been previously depressed, its notch 70 will be engaged by the lug 71 of the detent 72. It will be noted in Fig. 16 that the arm 291 is not directly pinned to the shaft 76 as in the previously described construction, but the connection between the arm and shaft comprises a torsion spring 761, one end of which is connected to the arm 291 and the other end fastened to the shaft 76.

Assuming, therefore, that an amount key has been depressed and the total lever 61 is in the add position it will be noted that depression of one of the keys will bring the notched portion 293 (Fig. 10) of the rearmost stop of that bank in engagement with one of the arms 292 fast to the shaft 76 thus holding said shaft rigid. When the lever 61 is moved out of the add position the rod 286 will be moved downwardly, this resulting in rocking the arm 291 counter clockwise (Fig. 9) and since the shaft 76 is held against rotation the spring 761 will be tensioned, the energy in the spring tending to rock the shaft 76 counter clockwise as viewed in Fig. 10. At a certain point in the movement of the control lever out of the add position the rod 286 will engage the arm 126 moving the amount key detents downwardly thus disengaging the notch 70 of the depressed key from the lug 71 of the detents and permitting the spring 68 to return the key to its normal position.

When a depressed key is returned to its normal position the key stops will be unlocked so that the energy in the spring 761 will be effective to rock the shaft 76 and raise the arms 292 (Fig. 10) of the amount and clerks' banks upwardly bringing them in front of the rearmost key stop thereby locking the related keys against movement.

Summarizing the modified construction, therefore, movement of the control lever 61 out of the add position will automatically release the amount keys which have been incorrectly depressed and subsequently lock the keys in the amount and clerks' banks against operation.

Any suitable means may be utilized to retain the total lever 61 in its adjusted position so that when the lever is out of the adding position the rod 286 will be retained in its lowered position, and since this will hold all of the amount key detents 72 down it will through the extension 78 hold the zero stop pawls 80 so that the shoulders 148 are out of cooperative relationship with the associated complementally movable levers 145. As can be seen from Fig. 4 the arms 126 connected to the detents 72 of the four amount banks all underlie the rod 286 so that all the zero stops of these banks will be disabled.

As has been heretofore stated no keys are provided for the two highest denominational orders of the totalizer, but a zero stop pawl 80 of the usual form is provided for each of these two orders and is operated by a detent plate 289 (Fig. 3) somewhat similar to the detent associated with the banks of keys, with the exception that in this case the lugs 71 are omitted. The arm 290, which is connected to the upper end of the detent 289 is similar to the arms 126 of the other amount key banks and is also of sufficient dimensions to underlie the rod 286.

If the arm 88 (Fig. 5) associated with the clerk's key bank does not extend sufficiently to engage the rod 286 the zero stop pawl of the clerk's key bank will not be disabled by movement of the total lever 61 out of the add position.

As can be seen in Fig. 4 the arm 1263 connected to the detent of the transaction key bank is not in the path of movement of the rod 286 so that in this case also the zero stop pawl 80 for the transaction bank of keys will not be disabled when the total lever is moved out of the adding position.

While, as shown in Fig. 9, the key stop 109 and its projection 108 normally prevents depression of the grand total printing key 62 the latter key is not locked when the total lever 61 is moved out of the adding position, since it is employed in total taking operations to select the grand totalizer. However, as is best shown in this figure, when the shaft 76 is rocked counter clockwise by movement of the lever 61 out of the adding position the locking detent 109 will be moved downwardly taking the shoulder 108 out of engagement with the pin 107 carried by the grand total key 62, thereby releasing this key for operation. Simultaneously an extension 294 integral with the detent 109 will be moved into locking relationship with a stud 295 carried by the no-sale key 64 locking this key against operation since it is not employed in total-taking and resetting operations.

To prevent the disarrangement of the mechanism which might be possible if the control lever 61 were moved out of any of its adjusted positions after a partial movement of the operating mechanism had commenced the following safety device is provided: As shown in Fig. 6, the cam 225 is integral with a drum 296 which has a splined connection 297 (Fig. 11) with a shaft 57, so that by this means the cam 225 may be shifted laterally and still be in rotative engagement with the shaft 57. To shift the cam 225 laterally to perform different functions, which will be hereinafter described, the bifurcated member 281 (Fig. 9) which is connected to the total lever 280 carries a pair of pins 299 which are received by a groove 298 (Fig. 6) in the sleeve 296. Since the total lever 61 is pivoted at 282 movement of the same will, through the connection just described, shift the sleeve and cam 225 to any desired position.

In order to effectively lock the total lever after a partial operation of the machine, the drum 296 is milled so as to form annular rings 300 and grooves or slots 301, one for each position of the lever 61. As best shown in Fig. 11 the arm 222 has an integral segment-shaped portion the latter having a beveled edge 302 adapted to be received by any of the slots 301 and when it is in alinement with the particular slot the total lever is in a properly adjusted position. As can be seen from Fig. 12 the periphery of each annular ring 300 is cut away, the cut 303 being substantially concentric with respect to the shaft 136. When the drum 296 is so adjusted that the beveled edge 302 is in cooperation with one of the slots 301 and the shaft 57 partially rotated, it will be obvious that the sides of the adjacent annular ring 300 will engage the beveled edge 302, and since the arm 222 is held against lateral movement on the shaft 136 by a collar secured to the shaft (Fig. 6) and by a portion of the frame 41, movement of the drum 296 and parts carried thereby cannot be effected by an attempted adjustment of the total control lever 61. The beveled edge 302, it will be noted, is of sufficient length to maintain engagement in a slot 301 throughout the rocking movement of the arm 222.

If the total lever should have been improperly adjusted the cut 303 of one of the rings 300 will be directly in line with the beveled edge 302 thereby acting as a Geneva lock against the rotation of the drum 296 and shaft 57. This prevents any movement of the crank 50 or shaft 57 as long as the total lever is not set properly even though the usual machine lock is released by the total lever or a clerk's key.

In taking totals the printing segments are adjusted to the same extent as the totalizer actuators which are at this time engaged with the totalizer pinions and therefore are moved to extents required to restore these pinions to zero.

As may be observed in Fig. 15, the totalizer elements are rotated in a clockwise direction in adding operations. However, during totaling operations they are reversely rotated so that the totalizer elements may control the movement of the racks 214 and type carriers 173 a corresponding amount to that on the totalizer. The movement imparted to each rack 214 is governed by the engagement of a tripping projection 256 of the respective totalizer elements with a trip tooth 257 of a transfer arm 258 when the totalizer elements have reached their zero positions.

It is essential that, in order that the totalizer elements control the movement of the actuating racks and printing segments, the pinions of the selected totalizer be meshed with the actuators before the latter have begun their movement. This is effected by movement of the total control lever 61 to the "read" position which will shift the drum 296 laterally along the shaft 57, so that while the pin 223 is still in engagement with the slot in the cam 225 (Fig. 12) the adjacent pin 224 will now cooperate with a cam slot formed in a companion cam 307 (Fig. 11) which is integral with the drum 296 and also rotatable with the shaft 57. It will be noted that in this case movement of the arm 222 and stud 220 will be controlled by both the box cams 225 and 307.

It will be recalled that the spring 141 (Fig. 2) is connected to the lever 139 and is utilized for the purpose of holding said lever 139 against movement until the lever 145 and the plate 146 have been given the full movement, it being understood that the tension in the spring 141 is sufficient to hold the lever 139 so that its forward end is in constant engagement with the shoulder 140 of the frame until the lever 145 has been stopped by the engagement of the stem of the depressed key in adding operations or as will now be described by the engagement of the tripping projection 256 with the trip tooth 257 in totaling operations.

Adjustment of the total control lever to the read position will unlock the machine for operation as explained before so that the total from the cash totalizer may be obtained. As the crank 50 is operated the shaft 57 will be rotated in the direction of the arrow shown in Fig. 11, the pin 224 describing a path defined by the eccentric portion of the slot 308 in the cam 307. It will be noted in the beginning of the operation of the machine that the arm 222 will be almost immediately rocked clockwise, resulting in carrying the stud 220 forward (Fig. 13). Since the lever 145—T will be held by the zero stop 80 the lever 139—T will be rocked downwardly at once until the pin 227 engages the cam 228 and rocks it counter clockwise so that during the first partial operation of the machine the pinions of the cash totalizer 231 will be meshed with the actuating racks 214 (Fig. 15) which are at this time stationary. After the pinions are meshed with the actuating racks the pin 224 will be located in a concentric portion 309 of the cam slot in the box cam 307 and as it will be observed in Fig. 12 the cam 225 is also provided with an eccentric portion 310 and a concentric portion 311 corresponding to the cam portions 308 and 309 of the cams 307.

In the foregoing reference has been made to the fact that movement of the total lever out of the add position will disable all the zero stops 80 of the amount differential devices, this not only applies to the denominational orders for which keys are provided but also to the two highest orders as well. In this manner the total lever 61 unlocks all of the actuator racks 214.

As the pins 224 and 223 enter the substantially concentric portions 309 and 311 of the cams 307 and 225 respectively, the cams 134 (Figs. 2 and 6) will be effective to rock the universal rod 137 forwardly but since the spring 141 is sufficient to hold the forward end of the lever 139 against the abutment 140 continued movement of the universal rod 137 will result in a clockwise movement of the lever 145 (Fig. 2) the rack segment 146, the connected actuating rack 214 and type segments 173, and since the totalizer pinions are at this time in engagement with the racks the latter will be moved differentially until the tripping projection of each totalizer ultimately engages its related trip tooth at which time the corresponding lever 145 will be positively stopped just as if it had struck the stem of a depressed key. Continued movement of the universal rod 137 will then rock the lever 139 until it approximately strikes its associated lever 145. At this time the printing segments will have been adjusted to positions determined by the totalizer pinions and the platen will then be operated to effect a printing impression upon the record strip to exhibit on the record strip the amount which has been standing upon the totalizer.

Since in a total "reading" operation it is desired to retain the amount subtracted from the totalizer elements upon the totalizer, the actuators and printing segments are rotated reversely an equal amount while the pinions are still in mesh with the actuating racks 214 it being understood that the length of the concentric portions 309, 313 and 311, 226, are sufficient for this purpose and in the case of the cam 225 the pin 223 will pass into a portion of the cam slot 226 utilized for adding operations as already explained.

Attention is called to the fact that the slot 309 opens up into an eccentric cam slot 312. The cam slots 309 and 312 are of a greater depth than the cam slot 313 but in reading operations the pin 224 is moved into the cam slot 309 only a depth equal to that of the cam slot 313. It should be stated that the cam 225 is similarly constructed, that is, the adding-controlling cam groove 226 is of greater depth than the portions 310 and 311 which are effective only during "read" totaling operations. By a comparison of Figs. 11 and 12 it will be noted that the break between the concentric portions 309 and 313 of the cams 307 required for the opening channel 312 falls at a slightly different point from a similar break between portions 311 and 226 of cams 225 so that one or the other of the pins 223 and 224 will at all times be riding in an unbroken raceway during "read" operations.

After the racks 214 are returned to their normal positions an eccentric slot 314, which is a continuation of the cam slot 313 will be effective to rock the arm 222 so that the stud 220 will separate the transaction differential levers 139—T and 145—T thus positively withdrawing the totalizer pinions from mesh with the actuating racks 214.

It will also be noted that when the total lever is moved to the "read" position and the shaft 76 (Fig. 13) is rocked counter clockwise, as previously described, a downwardly extending arm 315 attached to the shaft and having a pin and slot connection 316 to an upward extension of the plate 235 will also be rocked. When the total lever is moved either to the read or reset position it will rock the plate 235 clockwise so that the projection 242 will be disengaged from the pin 243, but will be positioned at a cut-away portion 317 of the plate 235 between the projections 241 and 242 so that when the cash totalizer is rocked into and out of engagement with the racks during totalizing operations, rocking of the cam 228 will not cause movement of the plate 235 and therefore will not permit an engagement of the grand totalizer 232 with the actuating racks when it is desired to obtain the totals from the cash totalizer.

When it is desired to obtain the total standing on the grand totalizer it is necessary to retain the control lever 61 in the read position and then depress the grand total key which will result in releasing the machine by the connection shown in Fig. 17 and in disabling the zero stop pawl 80 (Fig. 13) of the transaction bank, thus releasing the transaction lever 145—T for movement so that said lever 145—T will strike the stem of the depressed grand totalizer key 62 which will permit the pin 243 to cooperate with the projection 241 and will carry the cam 228 upwardly sufficiently to disengage the lug 229 from the slot 216 in the link 215 related to the cash totalizer. Therefore when the pin 227 engages the cam slot 230 of the shaft 228 it will rock the plate 235 downwardly and by means of the slot 234 engaging the pin 233 will draw the arm 215—G of the grand totalizer downwardly and immediately engage the grand totalizer pinions with the actuating racks 214. It will also be noted that at this time the lower end of the arm 215—G registers with the notch 252 of the plate 250. The rest of the operation is similar to that described in connection with the cash totalizer total operation and will therefore not be repeated.

Printing of the totals standing upon the paid-out, charge and received-on-account totalizers is effected by merely depressing the desired key and operating the crank handle 50 so that in each instance the lever 145—T will have been moved differentially until the lug 229 will have engaged the slot 216 of the corresponding arm 215 and so that the pinions of the desired totalizer would be engaged with the actuating racks which are then reciprocated to adjust the type carriers differentially and to subsequently reenter the amount subtracted from the totalizer elements. In obtaining the totals from the paid-out, charge and received-on-account totalizers it will be noted that in each case the pin 243 will locate over a cutaway portion of the plate 235 so that the grand totalizer will not be simultaneously meshed with any of the other totalizers during total operations.

The operation whereby the totals are printed from the different totalizers and the totalizer elements are permitted to remain at zero is somewhat similar to that previously described but to accomplish this the total lever 61 is moved to the extreme right position, or in other words to that designated as the "reset" position. This will regulate the action of the totalizer engaging mechanism so that the selected totalizer will be disengaged from the actuating racks when the racks are in their upward or differentially-moved positions, thus leaving the selected totalizer at its zero position. Also in the same instance the total amount added to the totalizer is printed on the record strip.

When the total lever is moved to the reset position the pin 223 is entirely disengaged from cooperation with the cam 225 but the pin 224 will be moved deeper into the slot 308 of the cam 307 so that in resetting operations also the totalizer pinions will be immediately drawn into engagement with the actuator racks 214 which are then moved upwardly differentially as controlled by the totalizer pinions but at substantially the time the amount levers 139 and 145 are adjacent each other at which time the racks 214 will have been given their maximum upward movement. The stud 224 (Fig. 11) will be at the junction of the slots 312 and 313.

As previously stated the slot 312 is deeper than the slot 313 so that the pin 224 striking the wall 318 will not be able to pass into the slot 313 but will necessarily pass into the slot 312 which as noted is eccentric to the shaft 57 so that the levers 139—T and 145—T of the transaction bank will be separated and the zeroized totalizer elements will be withdrawn from the actuating racks. With the exception of the difference in timing just mentioned the resetting operations are similar to those described in connection with the printing of read totals. When the total lever 61 is shifted to the reset position the machine is conditioned for resetting the cash totalizer 231 and the resetting of the other totalizers may be performed by the depression of the related key which will release the machine for such operations, and as long as the total lever remains in the reset position the totals may be printed upon the record strip and the elements will be left in their zero positions.

To prevent unauthorized persons from moving the control lever 61 out of the adding position the segmental portion 283 (Figs. 4 and 9) of the control lever 61 is provided with an integral lug 320 which normally is adapted to cooperate with a shoulder 321 of a disk fast to the barrel of a lock 322 which as shown in Fig. 1 projects through the machine cabinet. The lock 322 is adapted to retain the total control lever in the adding position. The key of the lock 322 is usually retained by the proprietor or some other person of authority so that when the lock is operated the control lever may be moved to the read position at which time the lever will be stopped by the coaction of the lug 320 with a shoulder 323 of a disk carried by a second lock 324.

In some classes of business it is desirable that some other person should have control of the resetting of the various totalizers and it is for this reason that the lock 324 is provided. When the lock 324 is operated the control lever may be moved to its extreme position permitting the resetting of the totalizers as previously described.

When it is desired that one person have entire control over the reading and resetting of the totalizers the lock 322 only is provided which normally retains the control lever 61 in the adding position.

*General summary of operations*

The nature of the improved mechanism is such that in order to make the foregoing description as clear as possible it has been necessary to state the operation considerably in detail as an incident to explaining the various features of construction. A complete restatement here of the operations is therefore believed to be unnecessary. However, a résumé of the of the general operation of the machine will now be given to coordinate the operations and functions of the various parts which have been described in detail.

It will be assumed, for example, that clerk "A" desires to enter a cash transaction amounting to $8.25. It will also be assumed that the total control lever 61 is in its normal or add position, and that the printing mechanism is equipped with an inking ribbon and a record strip and that the machine has been previously conditioned for accumulating items pertaining to the present period of business.

The clerk will first depress the amount keys 58 in the various banks and it will be noted that as the amount key in each bank is operated the inclined edge 69 (Fig. 2) will by its engagement with the lug 71 of the associated detents rock the latter downwardly against the tension of the spring 77 until the lug 71 is positioned over the notch 70 permitting the spring 77 to draw the detent upwardly a slight amount until the lug has been caught by the notch 70. In this manner the amount keys will be held depressed and as the detent of each bank is operated the extension 78 will by engagement with the pin 79 disengage the zero stop pawl 80 from the shoulder of the lever 145 of the associated differential mechanism.

In the event that one of the amount keys should have been depressed in error the operator will depress the release key 132 (Fig. 2) and by rocking the shaft 131 the engagement of the rod 129 with the extension 128 of the operated detent 72 will rock all the detents downwardly enough to disengage the lugs from the notches 78 of the depressed keys whereby the springs 68 of each of the depressed keys are effective to return them to their normal positions.

If the correct amount keys have been depressed the operator will then depress his associated clerk's key 59 which will be latched in its depressed position in a manner similar to that just described. When the clerk's key 59 is depressed the arm 88 (Fig. 5) will be rocked downwardly and by the engagement of the pin 89 with the arm 90 (Fig. 10) it will rock the latter downwardly and since the shoulder 96 of the arm 90 cooperates with the spring-pressed pawl 97 it will rock the bell crank 93 clockwise and disengage the lug 92 from the shoulder of the disk 91, whereupon the spring 94 will be effective to move the lug 92 upwardly so that it will rest upon the periphery of the disk 91 and retain the machine in an unlocked condition.

Since the clerk's key moves the detent 84 (Fig. 5) downwardly it will bring the concentric edge 134 of the supporting arm 85 in front of the rod 129, locking the shaft 131 against movement and preventing manipulation of the error key. Thus it will be impossible to release any of the amount keys after the machine has been released for operation.

Further operation of the machine comprises the operation of the crank handle 50 which is given two turns to perform the various functions which will now be described, attention being directed at this time to the fact that since the transaction is assumed to be a cash transaction none of the transaction keys need be depressed.

As the crank handle 50 (Fig. 8) is rotated its connected gear 51 will, through the gear 52 drive the shaft 53 and by means of the intermediate gear 54 and gear 56 will also drive the shaft 57. When a partial operation of the shaft 53 begins the arms 116 and 117 (Fig. 4) will be rocked downwardly by their associated cams 119 (Figs. 2 and 9) so that the bail 115 will be rocked upwardly until it will engage either one of the other of the adjacent notches 113 and 114 (Fig. 2) of the amount key detents, depending upon whether or not a key has been depressed in that particular bank. In a similar manner the bail 115 will also engage either of the adjacent notches 123 (Fig. 5) of the clerk's key detent and likewise the bail will engage one of the adjacent notches 125 of the extension 124 (Fig. 10) of the detent 104 of the transaction bank, it being clear therefore that all of the keys of the different banks are locked against depression whether the keys in those banks have or have not been depressed.

As the shaft 57 partakes of its counter clockwise rotation (Fig. 2) the cams 134 after an initial idle movement will be effected to rock the universal rod 137 forwardly about the pivotal point 136 to differentially adjust the levers 139 and 145. Since the springs 141 have sufficient tension to temporarily hold the levers 139 so that their forward ends engage the abutments 140 of the frames and since the shoulders 148 of the zero stop pawls 80 are released from the levers 145 of the differential devices of the banks in which the keys have been depressed, the forward movement of the universal rod 137 will through the pivotal connections 142 of the levers 139 with the segments 146, rock the latter clockwise until the forward ends of the levers strike the stems of the "8" key in the dollars bank, the "2" key in the dimes bank, and the "5" key in the cents bank, and after this has been performed the companion levers 139 of the different banks will be rocked downwardly so that the forward ends strike the opposite sides of the stems of said depressed keys. The result of this construction is that each rack 146 will through its associated segment 168, shaft 169 and segment 170 (Figs. 2, 7 and 15) differentially adjust its related segmental rack 214 and simultaneously bring to the printing line a character 174 corresponding to the key depressed.

Similarly referring to Fig. 5 it will be noted that as the universal rod 137 commences its forward movement it will rock the lever 145 and the clerk's differential device upwardly since the shoulder 148 of the clerk's zero stop pawl 87 has been disengaged from the forward end of the lever 145 and since the uppermost key in the bank has been depressed, namely, the "A" key, the lever 145 will be given its maximum movement until it strikes the lower side of the stem of this key so that the segment plate 146 meshing with the segment 175 will rock the shaft 176, and as best shown in Fig. 6 the segment 177 at the right end of this shaft will adjust the clerk's printing segment 178 to bring the letter "A" under the platen.

At a certain point in the operation of the machine the cam 225 (Fig. 12) by the coaction of the pin 223 with the slot 226 of the cam will rock the arm 222 (Fig. 11) clockwise so that the stud 220 (Fig. 13) will rock the lever 139—T of the transaction differential downwardly until the pin 227 engages the cam slot 230 of the cam 228 and rocks the latter so that the lug 229 engaging the slot 216 of the arm 215 of the cash totalizer will draw the pinions 213 (Fig. 15) of the latter into engagement with the actuating racks 214 which are at this time differentially positioned and are stationary.

Attention is also called to the fact that since the pin 243 (Fig. 13) normally coacts with the projection 242 of the plate 235 the latter will be forced downwardly and rearwardly so that the pin 233 cooperating with the cam slot 234 will carry the arm 215—G of the grand totalizer downwardly, thereby bringing the associated pinions into mesh with the actuating racks 214 to receive the same amount upon the grand totalizer as will be entered upon the cash totalizer.

During a further operation of the machine the slots in the cams 134 (Fig. 2) will then be effective to rock the universal rod 137 in a reverse direction or rearwardly so that each segment 146 will be returned to its normal position and the related racks 214 (Fig. 15) will be brought to their normal positions, thus entering upon the elements of the cash totalizer as well as of the grand totalizer the amount represented by the depressed key.

Upon a continued operation of the machine the levers 139—T and 145—T of the transaction differential mechanism will next be separated and the cooperation of the pin 227 (Fig. 13) with the forward end of the cam slot 230 will force the arm 215 forwardly positively withdrawing the cash totalizer pinions from mesh with the actuating racks. At the same time the spring 237 will be permitted to force the plate 235 outwardly and disengage the grand totalizer elements from the racks.

At a certain point in the operation of the machine, preferably toward the end of the operation, the cams 119 (Fig. 2) will be effective to rock the bail 115 downwardly thus rocking all of the amount key detents 72 in the same direction disengaging the lugs 71 from the notches 70 of the depressed keys and permitting the springs 68 to return the depressed keys to their normal positions. The clerks' and transaction keys are similarly released.

While the printing segments were at their differentially adjusted positions the cam 197 (Fig. 7) cooperating with the pitman 195 will have rocked the platen 185 (Fig. 15) downwardly against the type and by means of the inking ribbon will have effected a printing impression on the record strip which is then fed in the usual manner.

When it is desired to perform a no-sale operation which is utilized sometimes for the purpose of obtaining access to a cash drawer with which the machine is intended to be supplied and as shown very generally in Fig. 5, the no-sale key 64 (Fig. 1) is depressed and this is followed by the depression of the desired clerk's key. In this instance the lever 145—T (Fig. 13) will be unlocked by the disabling of the zero stop pawl 80 of the transaction bank which will permit the lever 145—T to rock upwardly until it strikes the lower side of the stem of the depressed no-sale key after which the lever 139—T will be moved downwardly until it strikes the opposite side of the stem of the depressed no-sale key. During the upward movement of the lever 145—T the lug 229 will be disengaged from the slot 216 of the arm 215 of the cash totalizer and as the lever 145—T rotates about its pivotal point 147 the lug 229 will pass successively through the notches of the arms 215 of the paid-out and charge totalizers and finally will occupy a position between the arms 215 of the charge and received-on-account totalizers.

When the pin 227 enters the cam slot 230 to rock the cams 228 clockwise it will not draw the grand totalizer 232 into mesh with the actuating racks since the pin 243 is at this time over a cut-away portion of the plate 235. However, the printing segment associated with the transaction bank will be adjusted to such a position that it will print upon the record strip the letters NS and since the clerk's printing segment is adjusted differentially there will also be printed an initial together with a line of zeros, since it is assumed that no amount keys are depressed in a no-sale operation.

Paid-out transactions are entered in the usual way, that is, by the depression of the amount keys followed by the depression of a paid-out key with a subsequent depression of the desired clerk's key. When the paid-out key is depressed the transaction differential lever 145—T will be adjusted to such an extent that the lug 229 will engage the notch 216 of the arm 215 of the paid-out totalizer so that in this instance the pinions of the paid-out totalizer will be drawn into mesh with the actuating racks. Also in paid-out transactions the pin 242 will be located over a cut-away portion of the plate 235 so that the amount entered in the paid-out totalizers will not be entered upon the grand totalizer 232.

The other transactions, such as received-on-account and charge are entered in the usual manner, the operator in each instance depressing the appropriate transaction key and in charge transactions the amount registered will also be accumulated in the grand totalizer 232 while in received-on-account transactions the grand totalizer will not be operated.

Attention is directed to the fact that whenever a totalizer is to be operated the notch 248 of the segment plate 244 will register with the lower end of the arm 213 of the selected totalizer but at any other time the lower end of the arm will engage the periphery of the segmental plate 244. In a similar manner when it is desired to engage the grand totalizer with the actuating racks one of the notches 251 or 253 of the plate 250 for the cash and charge entries respectively will register with the lower end of the arm 215 of the grand totalizer and at any time the grand totalizer is retained in its upper position by the periphery of the plate 250 as well as by the spring 237 which urges the plate 235 upwardly.

In a similar manner all of the transactions occuring during the period of business under consideration are successively entered in the machine and when it is desired to obtain the totals standing upon the various totalizers without subsequently resetting them the total lever 61 is unlocked and adjusted so that it will be adjacent the word "read".

If the total lever should have been improperly adjusted the cut-out portion 303 (Figs. 11 and 12) of one of the annular rings 300 will be directly in alinement with the beveled edge 302 of the arm 222 thereby locking the shaft 57 and therefore the crank handle 50 so that as long as the total lever is not properly set even though the machine may be released by the total lever or clerk's key the crank cannot be operated.

When the total lever is moved to the read position the camming portion 284 (Fig. 4) of the same will by cooperation with the rearward extension of the arm 285 rock the rod 286 (Fig. 10) downwardly so that by its coaction with the extension 288 it will rock the arm 90 downwardly and release the machine for an operation in exactly the same manner as the clerks' keys do. At the same time the releasing connections (Fig. 17) controlled by the transaction keys are rendered effective by movement of the rod 286 into the path of the member 902.

As the rod 286 is moved downwardly the coaction with the rearward portions of the arms 126 (Fig. 4) will rock the detent 72 of all of the amount key banks and if the modified form of Fig. 16 is employed, will disengage the lugs 71 of the related detents from the notches of any of the previously depressed keys permitting the spring 68 to return any of the keys which have been depressed prior to movement of the total lever from the add to the read position.

When the detents are moved downwardly each of the zero stop pawls 80 of the amount banks will be disabled and in the same way the plate 289 (Fig. 3) will disable the zero stop pawl 80 for the actuators of the two highest denominational orders.

Figure 8:
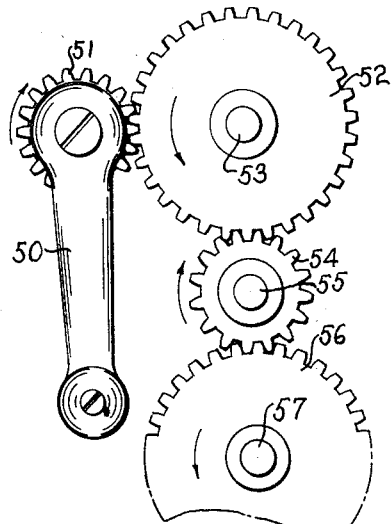
Fig. 8 is a detail showing the operating crank and its connections to the various driving shafts.

Furthermore it should be noted that when the rod 286 is moved downwardly the shaft 76 will be rocked clockwise bringing the arm 292 (Fig. 10) in rear of the rearmost key stops of the groups provided for the amount and clerks' banks of keys, locking all of the key stops of these banks against operation and thereby preventing a depression of any of the amount keys and clerks' keys during totaling operations. The connections from the rod 286 to the shaft 76 may be direct or they may be flexible and include a spring 761 as shown in Fig. 16. If it is direct as shown in Figs. 5, 8 and 10, the rod 286 cannot be rocked and the total lever 61 will be locked so long as the amount or clerk's key is depressed.

When it is desired to print a total of the amount standing on the cash totalizer the crank handle 50 is given two rotations as in adding and as the crank is operated the shaft 57 and cam 307 will be rocked in the direction of the arrow shown in Fig. 11. The pin 224 describing a path defined by the eccentric portion 308 of the slot formed in the cam 307 so that the arm 222 will be rocked upwardly with the result that the stud 220 (Fig. 13) will be rocked forwardly so that the pin 227 carried by the lever 139—T will engage the cam 228 during the first partial operation of the machine so that the pinions of the cash totalizer 231 will be meshed with the operating rack 214 prior to any movement of the latter. Upon further operation of the machine the cams 134 (Fig. 2) will be effective to rock the universal rod 137 forwardly but since the springs 141 have sufficient tension to hold the forward ends of the levers 139 against the abutments 140 the continued movement of the universal rod 137 results in the clockwise rotation of the amount levers 145, rack plates 146 (Fig. 2) and the connected actuating racks 214 and type segments 173 (Fig. 15), and since the totalizer pinions of the cash totalizers are at this time in engagement with the racks each of the latter will be moved until the tripping projection of the related totalizer element engages its trip tooth at which time the corresponding lever 145 will be positively stopped and the continuous movement of the universal rod 137 will rock the associated lever 139 a distance complementary to that traveled by the lever 145.

At the extreme end of the operation of the machine the eccentric portion 314 (Fig. 11) of the slot in the cam 307 will be effective to rock the arm 222 so that the stud 220 will separate the transaction differential levers 139—T and 145—T and positively withdraw the totalizer pinions from mesh with the actuating racks.

When the total lever 61 is moved to the read position it will rock the plate 235 (Fig. 13) clockwise so that the projection 242 will be disengaged from the pin 243 and the latter will be positioned in a cut-away portion 317 between the projections 241 and 242 so that when the cash totalizer is rocked into and out of engagement with the racks during totaling operations the rocking of the cam 228 will not cause movement of the plate 235, and therefore will not permit engagement of the grand totalizer pinions with the actuating racks.

It will also be observed that when the total lever is moved to the read position the plate 109 (Fig. 9) is rocked downwardly, disengaging the extension 108 from the pin 107 of the grand total key 62, thereby unlocking the latter so that the total of the grand totalizer may be obtained. When the grand total key 62 is depressed it will serve to release the machine by the connections shown in Figs. 4 and 17 and the zero stop pawl 80 (Fig. 13) of the transaction bank will be disabled so that when the machine is operated the transaction lever 145 will be released for movement until it strikes the stem of the grand total key which will permit the pin 243 to cooperate with the projection 241 while the cam 228 will be moved upwardly sufficiently to disengage the lug 229 from the slot 216 of the arm 215 related to the cash totalizer. Therefore, when the pin 227 engages the slot 230 it will force the plate 235 downwardly and by means of the slot 234 engaging the pin 233 will draw the arm 215 of the grand totalizer downwardly and immediately engage the grand totalizer pinions with the actuating racks 214. The rest of the totaling operations for the grand totalizer is similar to that described in connection with the cash totalizer totaling operation and will therefore not be repeated.

Printing of the totals standing upon the paid-out, charge and received-on-account totalizers are obtained by merely depressing the desired key and then operating the crank handle so that in each instance the lever 145—T will be moved differentially so that the lug 229 will engage the slot 216 of the corresponding arm 215 thereby engaging the pinions of the desired totalizer with the actuating racks which are then reciprocated to adjust the type carriers differentially and subsequently reenter the amount subtracted from the totalizer elements. Concerning the totals for the paid-out, charge and received-on-account totalizers, it will be noted that in each case the pin 243 will be located over a cutaway portion of the plate 235 so that the grand totalizer will not be simultaneously meshed with any of the other totalizers during totaling operations.

To obtain the totals from the different totalizers and reset them to zero the total lever 61 is unlocked and then moved to the extreme right (Fig. 1) or the "reset" position. When the lever is moved to the "reset" position the pin 223 (Fig. 12) is entirely disengaged from cooperation with the cam 225 while the pin 224 (Fig. 11) will be moved deeper into the slot 308 of the cam 307 so that in resetting operations the totalizer pinions will also be immediately drawn into engagement with the actuator racks 214 which are then moved upwardly to differential extents and when the racks 214 have been properly set by the bringing together of the amount differential levers 139 and 145 the stud 224 will be at the junction of the slots 312 and 313, and since the slot 312 is deeper than the slot 313 the pin 224 striking the wall 318 will pass into the slot 312 thereby rocking the stud 220 (Fig. 13) to the rear so that the zeroized totalizer elements will be withdrawn from the actuating racks which are then returned to normal positions.

When the total lever 61 is in the reset position the machine is conditioned for resetting the cash totalizer 231 and the resetting of any other totalizers may be performed by the depression of the related key and as long as the total lever remains in the reset position the totals may be printed upon the record strip and the elements will be left in their zero positions.

Attention is also called to the fact that upon a partial operation of the machine in item-entering, reading and resetting operations the sides of the adjacent annular rings 300 (Figs. 11 and 12) engaging the beveled edge 302 of arm 222 will prevent any movement of the drum 296 so that the total lever 61 is positively locked in its adjusted position during operations of the machine.

While the form of mechanism herein shown and described is admirably adapted to fulfill the objects primarily stated, it is to be understood that it is not intended to confine the invention to the one form of embodiment herein disclosed for it is susceptible of embodiment in various forms all coming within the scope of the claims which follow.

What is claimed is:

1. In an accounting machine, the combination of a bank of keys, of a detent plate for holding any adjusted key in actuated position, of a differential device constructed to have its movement controlled by said keys, a zero stop normally preventing movement of said differential device but constructed to be released by said detent plate, a main operating device for operating the differential device, means for normally locking the main operating mechanism, a releasing key constructed to operate said detent plate thereby releasing any key held in actuated position and permitting the return of the zero stop to normal, a special key, a detent plate and zero stop operated by the special key, means controlled by the special key for releasing the locking device for the main operating mechanism and means whereby operation of the special key locks the releasing key through the cooperation of the last mentioned detent plate and zero stop.

2. In an accounting machine, the combination of a plurality of banks of keys, of a detent for each bank of keys moved by any key in the bank whereby the operated key will be held in actuated position, a releasing key means controlled by said releasing key whereby the detents may be operated to release the keys held in actuated position, and means whereby operation of the releasing key locks the keys of only those banks in which none are held in actuated position.

3. In an accounting machine, the combination of banks of keys, of a plurality of detent plates, one for each bank, for holding any adjusted key in actuated position, a pivoted member common to said detent plates, a releasing key connected to said common pivoted member to operate said detent plates thereby releasing any key held in actuated position, and members connected to each detent plate having an edge concentric with respect to the pivotal point of the common member.

4. In an accounting machine, the combination of a plurality of banks of keys, of a detent plate related to each bank for holding any adjusted key in actuated position, a releasing key constructed to operate said detent plates for releasing any key held in actuated position, members connected to said detent plates, a common pivoted member operated by said releasing key adapted to cooperate with said members whereby the detent plates are operated to release the keys, said members connected to said detent plates being provided with an edge concentric with respect to the pivotal point of said common member whereby the keys in the banks in which none are held in actuated position are locked while the releasing key is operated, a special key, a detent whereby the special key may be held in actuated position, a member connected to the special key detent plate, said member being provided with an edge which is concentric with the pivot of said member whereby it cooperates with the common member to lock the releasing key when the special key is held in actuated position.

5. In a machine of the class described, the combination of a plurality of banks of amount keys, of a detent plate for each bank moved by the depression of keys of its bank and serving to retain the keys in depressed position each detent plate having two adjacent notches, a main operating mechanism, a member common to all the detents, and means whereby the main operating mechanism moves the common member to engage the proper one of the notches in the detent plates depending on whether the same have been moved or not whereby the keys in all the banks will be held locked.

6. In a machine of the class described, the combination of a plurality of banks of keys, of a detent plate for each bank moved by the depression of keys of the related bank and serving to retain the keys in depressed position, each detent plate having two adjacent notches, a main operating mechanism, a member operated by the main operating mechanism and common to the detent plates of all the banks of keys, and means whereby the main operating mechanism moves the common member to engage the proper one of the notches in each of the detent plates depending on whether the same have been moved or not to lock the keys in all the banks and then subsequently moves the common member in a reverse direction to operate all the detent plates thereby releasing any keys held in actuated position.

7. In an accounting machine, the combination of an accounting device, of manipulative devices, a differential device controlled by the manipulative devices for determining the extent of operation of the accounting device, of a detent plate for holding said manipulative devices in actuated position, a main operating device for operating the differential device, and a bail member operated by the main operating mechanism adapted to first engage a portion of the detent plate to lock the manipulative devices while the differential device is being operated and then subsequently operate the detent plate thereby releasing any manipulative device held in actuated position.

8. In an accounting machine, the combination of a totalizer and a bank of keys for controlling the entering of items thereon, of latching devices for said keys, a control lever normally in a position for permitting the entering of items in the totalizer during an operation of the machine but movable to another position for controlling the recording of the totals on the totalizer during an operation of the machine, means for disabling the latching devices for the keys during an operation of the machine, means controlled by the total control lever for disabling the latching devices when the control lever is moved out of the item entering position, and means partially controlled by the return of a depressed key for subsequently locking the keys.

9. In a machine of the class described, the combination of a totalizer, of a bank of keys for controlling the entering of items thereon, a total control lever normally in position for permitting the entering of items in the totalizer during an operation of the machine but movable to another position for controlling the recording of the total on the totalizer during an operation of the machine, means whereby movement of the total control lever to the total controlling position releases the previously depressed key, and means partially controlled by the return of the depressed key, for subsequently locking the bank of keys.

10. In an accounting machine, the combination of a normally locked operating mechanism, a bank of keys for controlling the entering of items in a totalizer, a total printer, a lever controlling total printing, and means whereby the total control lever unlocks said operating mechanism, releases the depressed keys and subsequently locks them.

11. In a machine of the class described, an operating shaft, means normally locking said shaft against operation, a lever for releasing said shaft for a single operation when moved to one position of adjustment, and key controlled connections rendered effective by said lever when moved to said position for releasing said shaft for subsequent operations.

12. In a machine of the class described, a plurality of totalizers, actuators therefor, means for selecting said totalizers for operation, means adapted to condition the machine for a totaling operation by movement away from home position, a key, adapted to control the selection of one of said totalizers and locked against depression whenever the conditioning means is in home position, and means for releasing said key for operation only when the machine is conditioned for totaling.

13. In a machine of the class described, the combination with a totalizer, of an adjustable control lever normally adapted to permit the entry of items in the totalizer under control of item entering mechanism, a driving shaft, a plurality of shiftable cams rotatable with and shiftable on the driving shaft, means whereby adjustment of the control lever out of the item entering position shifts the cams to condition the machine for total taking or resetting operations of the totalizer, and interlocking devices preventing operation of the shaft when the control lever has been improperly adjusted, and conversely, preventing movement of the total control lever out of its adjusted position after the shaft has begun to rotate, said interlock including mechanism adapted to rotate and shift with the cams.

14. In an accounting machine the combination of a plurality of banks of keys, a detent for each bank of keys moved by any key in the bank whereby the operated key will be held in actuated position, a releasing key and means controlled by said releasing key whereby the detents holding keys in depressed position are operated to release said keys, and the detents associated with the banks in which no key has been depressed are locked during the time the keys are released to prevent depression of any of these keys.

15. In an accounting machine, the combination of a plurality of banks of keys; a detent for each bank of keys, each being movable from normal position by the depression of a key in that bank; an element for each detent and movable therewith; a clearing key; and a member operated by the clearing key to coact with the moved elements to operate their detents to release the depressed keys, and to lock the unmoved elements against operation.

ALLEN A. DICKE.